United States Patent
Schneider et al.

(10) Patent No.: US 12,242,014 B1
(45) Date of Patent: Mar. 4, 2025

(54) STUD FINDER

(71) Applicants: Trevor Schneider, Las Vegas, NV (US); Francis Schneider, Fowlerville, MI (US)

(72) Inventors: Trevor Schneider, Las Vegas, NV (US); Francis Schneider, Fowlerville, MI (US)

( * ) Notice: Subject to any disclaimer, the term of this patent is extended or adjusted under 35 U.S.C. 154(b) by 0 days.

(21) Appl. No.: 18/644,913

(22) Filed: Apr. 24, 2024

(51) Int. Cl.
| G01V 3/08 | (2006.01) |
| G01B 3/1007 | (2020.01) |
| G01C 9/34 | (2006.01) |
| G01C 15/00 | (2006.01) |

(52) U.S. Cl.
CPC .............. *G01V 3/08* (2013.01); *G01B 3/1007* (2020.01); *G01C 9/34* (2013.01); *G01C 15/004* (2013.01)

(58) Field of Classification Search
CPC .......... G01V 3/08; G01B 3/1007; G01C 9/34; G01C 15/004
USPC ....... 324/500, 537, 329–348, 323, 447, 425, 324/200, 206, 228, 256–259, 600, 637, 324/639, 658, 750.12, 76.11, 144
See application file for complete search history.

(56) References Cited

U.S. PATENT DOCUMENTS

| 4,272,036 | A | 6/1981 | Watermann |
| 6,532,676 | B2 | 3/2003 | Cunningham |
| 6,745,485 | B2 | 6/2004 | Shor |
| 6,957,495 | B1 | 10/2005 | Schmillen |
| 6,964,109 | B1 | 11/2005 | Bond |
| 7,161,343 | B1 | 1/2007 | Biary |
| 7,278,223 | B1 * | 10/2007 | Dever ...................... B25H 7/04 |
| | | | 33/666 |
| 7,287,336 | B1 | 10/2007 | Goodrich |
| 7,690,124 | B1 | 4/2010 | Henry |
| 7,756,665 | B2 | 7/2010 | Spanski et al. |
| 8,026,717 | B1 * | 9/2011 | Biary ...................... H02G 1/00 |
| | | | 324/228 |

(Continued)

FOREIGN PATENT DOCUMENTS

| GB | 2584551 A | 12/2020 |
| WO | 9841817 A1 | 9/1998 |

*Primary Examiner* — Raul J Rios Russo
*Assistant Examiner* — Trung Q Nguyen
(74) *Attorney, Agent, or Firm* — The Rapacke Law Group, P.A.; Andrew Rapacke

(57) ABSTRACT

An advanced multi-functional construction tool combines the capabilities of a magnetic stud finder, torpedo level, laser level (line or cross-line), tape measure, marking implement, and LED flashlight into one compact and versatile device. Designed to meet the varied needs of both professional contractors and DIY enthusiasts, this tool facilitates accurate stud detection, surface leveling, distance measurement, area illumination, and precise marking for layout tasks. Key features include an integrated line laser for precise alignment, Neodymium magnets for magnetic adherence to studs, orthogonal float levels for multi-directional leveling, and a retractable tape measure. Additionally, the tool boasts a retractable push pin mechanism for temporary wall attachment and hands-free operation, alongside a conveniently housed marking implement for easy access. This integration of multiple essential tools into a single unit not only enhances functionality but also significantly improves efficiency and precision in a wide array of construction and home improvement tasks.

16 Claims, 17 Drawing Sheets

(56) References Cited

U.S. PATENT DOCUMENTS

| | | |
|---|---|---|
| 8,266,807 B2 | 9/2012 | Olsen |
| 9,069,028 B2 | 6/2015 | Ebner et al. |
| 9,464,895 B2 | 10/2016 | Schubert et al. |
| 9,846,034 B2 | 12/2017 | Hill |
| 10,071,594 B2 | 9/2018 | Chernyshou et al. |
| 10,245,881 B2 | 4/2019 | Khangar et al. |
| 10,507,689 B2 | 12/2019 | Nosek et al. |
| 11,156,736 B1 | 10/2021 | De La Torre |
| 11,307,032 B2 | 4/2022 | Zhuang et al. |
| 11,554,605 B1 | 1/2023 | Fox |
| 11,906,304 B2 | 2/2024 | Schneider |
| 2002/0194744 A1 | 12/2002 | Shor |
| 2004/0255477 A1* | 12/2004 | Levine ................ G01C 15/004 33/286 |
| 2005/0076520 A1 | 4/2005 | Vary |
| 2008/0092402 A1* | 4/2008 | Ye ........................ G01C 9/00 33/764 |
| 2008/0174760 A1* | 7/2008 | Zhao ...................... G01S 7/481 356/4.01 |
| 2015/0091553 A1 | 4/2015 | Wong |
| 2018/0120099 A1 | 5/2018 | Apple et al. |
| 2019/0293826 A1 | 9/2019 | Barram |
| 2019/0301863 A1* | 10/2019 | Hill ........................ G01B 11/14 |
| 2022/0176733 A1 | 6/2022 | Wilson et al. |
| 2022/0196402 A1 | 6/2022 | Holloway et al. |
| 2022/0196546 A1* | 6/2022 | Wright .................... G01S 17/08 |
| 2022/0307835 A1 | 9/2022 | Basile |
| 2023/0103815 A1 | 4/2023 | Roels et al. |
| 2023/0119676 A1 | 4/2023 | Roudebush et al. |
| 2023/0314134 A1* | 10/2023 | Schneider ............. G01C 15/004 |
| 2024/0011772 A1* | 1/2024 | Matei ..................... G01S 17/08 |
| 2024/0077295 A1* | 3/2024 | Telega ................ G01B 3/1092 |

\* cited by examiner

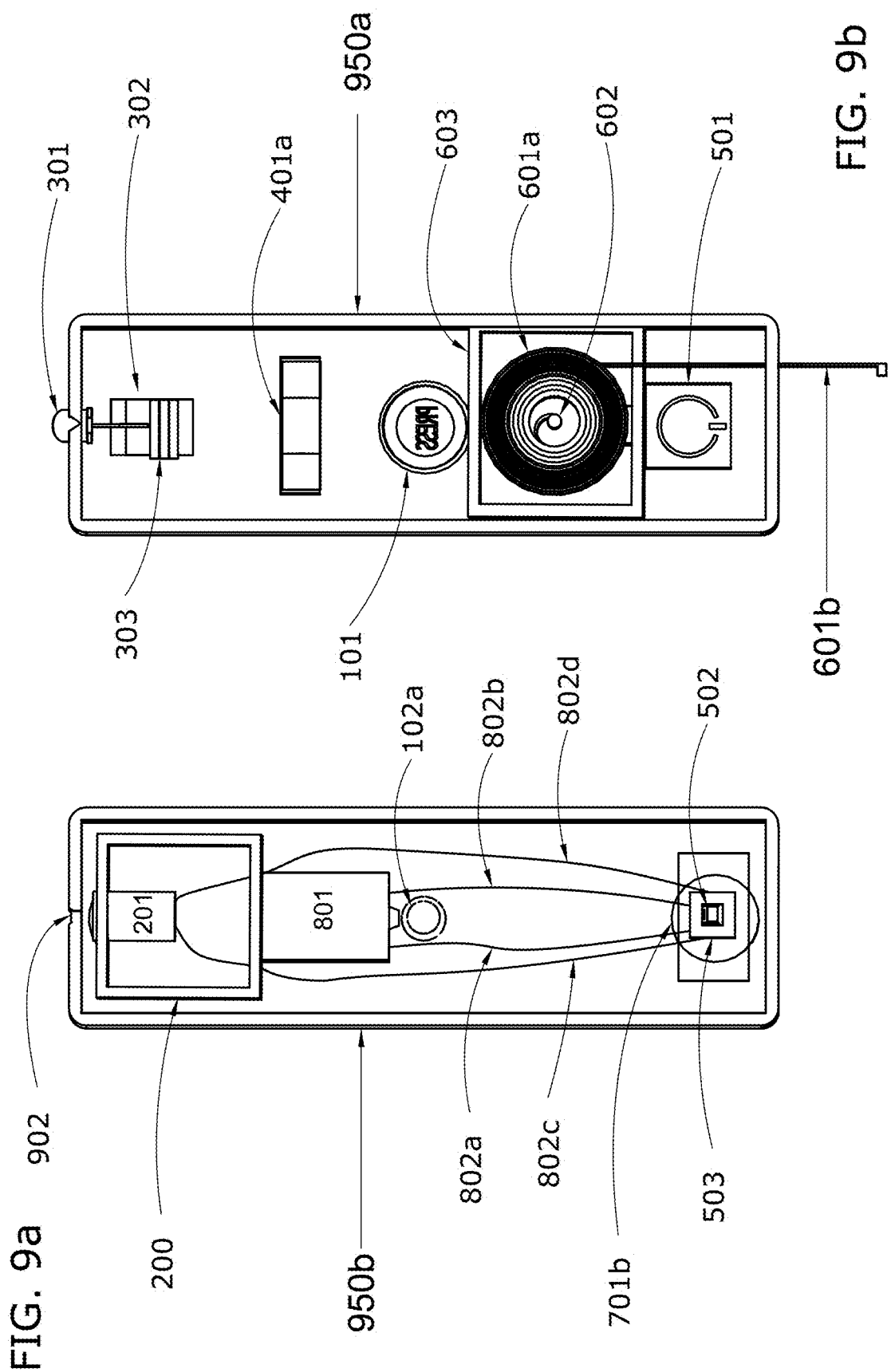

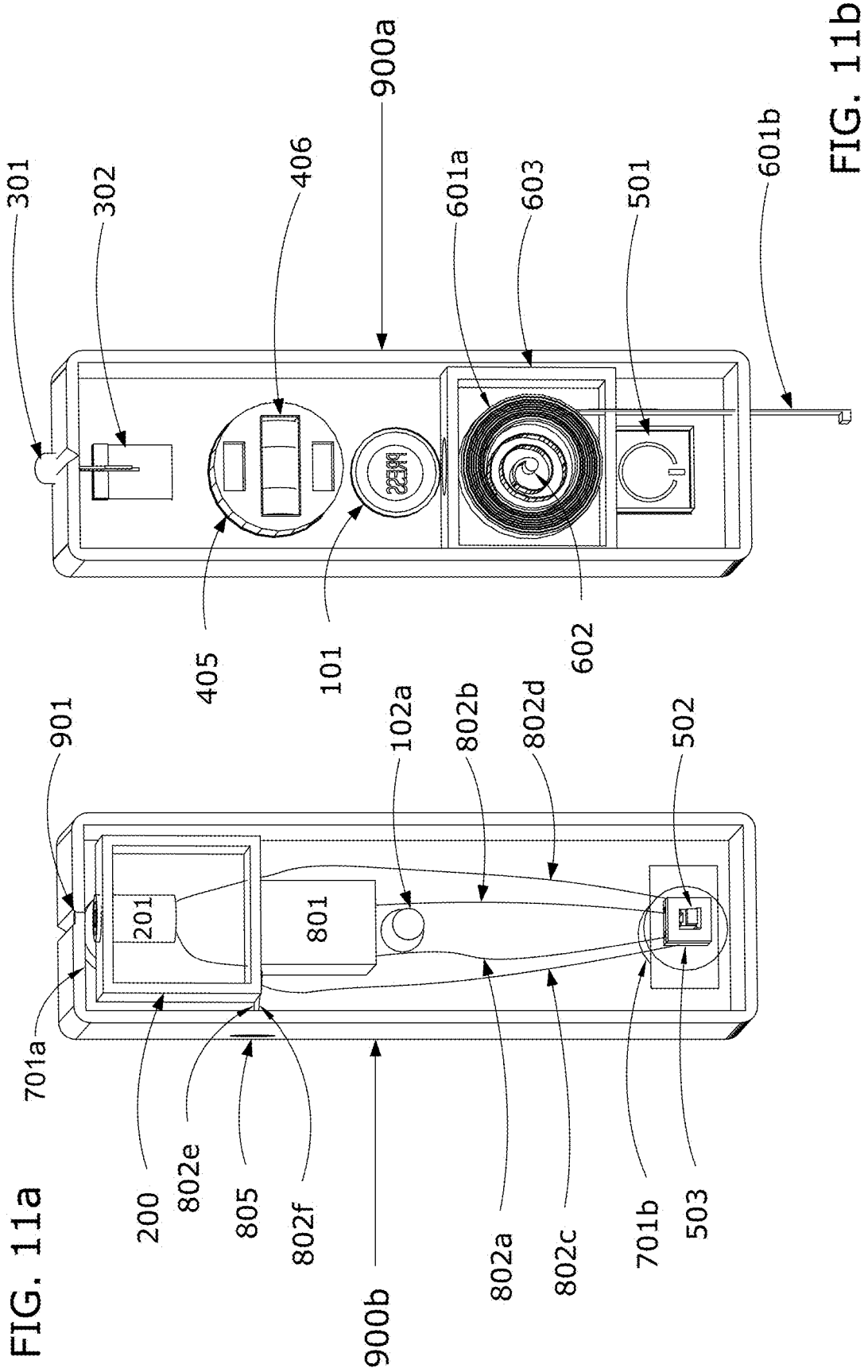

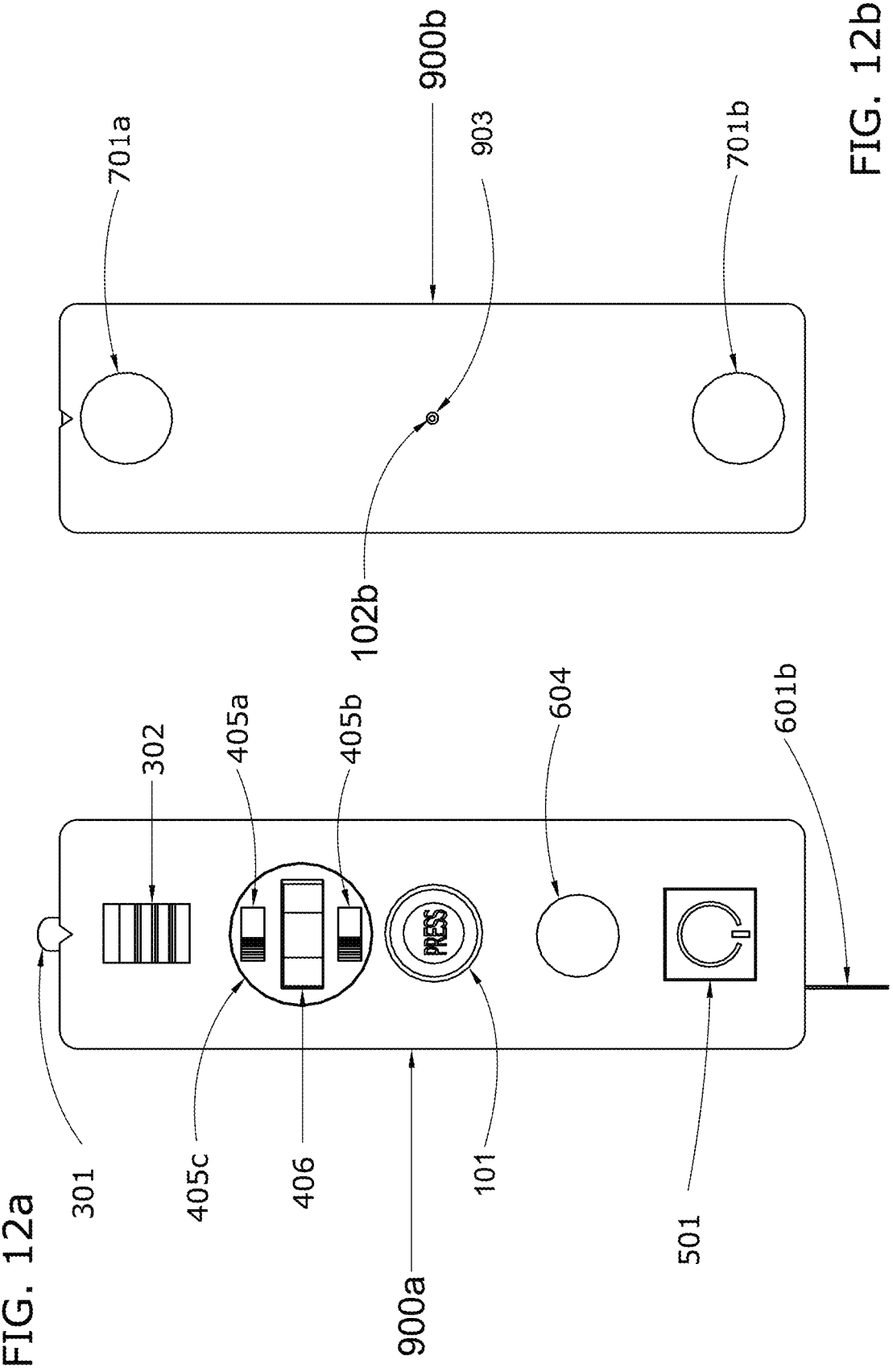

STUD FINDER

TECHNICAL FIELD

This application pertains to an innovative multifunctional device designed for construction assistance, specifically introducing a magnetic laser stud finder with integrated measuring capabilities. This advanced tool combines the precision of laser leveling with the utility of magnetic stud finding, enhanced by the addition of a tape measure, LED flashlight, retractable push pin, and a dedicated marking implement. Together, these features offer comprehensive support for various construction and home improvement tasks, enabling precise alignment, measurement, and marking on diverse surfaces.

BACKGROUND OF THE INVENTION

Contractors and DIY enthusiasts often juggle multiple tools for tasks such as finding studs, measuring distances, ensuring surfaces are level and aligned, and making precise markings, which are crucial for installing shelves, cabinets, hanging pictures, and general home renovations. However, there currently exists no single tool that integrates a torpedo level, line or cross-beam laser device, neodymium magnets, tape measure, flashlight, and a marking implement into a compact, multifunctional device. Such a tool would revolutionize efficiency and precision in various applications, from carpentry and cabinet installations to laying flooring, installing crown molding, conducting electrical and plumbing work, building outdoor constructions like decks and patios, assembling furniture, and executing precise DIY crafts and projects. It would significantly streamline home maintenance and repair tasks, ensuring structures are perfectly level, aligned, and accurately marked.

Therefore, there is a clear necessity for an integrated tool that encapsulates these functions. The proposed invention, a multifunctional measuring magnetic laser level stud finder equipped with a flashlight, seeks to fill this void. By amalgamating the essential features of several tools into one comprehensive device, it addresses the existing gaps and inefficiencies in current tool options, aligning with the principles and exemplary embodiments outlined herein.

In line with this invention, the identified challenges are effectively addressed by introducing a multi-functional measuring magnetic laser level stud finder with an integrated flashlight. This invention adheres to the outlined principles and demonstrated embodiments, offering a consolidated solution that encapsulates the functionalities required for comprehensive construction and home improvement tasks.

In one embodiment, the present invention is an article of manufacture for providing a multifunctional tool that integrates the capabilities of a magnetic laser stud finder with additional features. This tool includes a rectangular torpedo level device body with a first end, a second end, a top surface, and a bottom surface. A cross or line laser device projects from the first end for precision stud finding and leveling. The bottom surface houses a pair of Neodymium magnets for magnetic adherence to metal objects or nails and screws located within studs. Atop the device, two configurations of float level devices are embedded within the top surface: standard dual float levels for horizontal and vertical leveling, or an innovative swivel float level. The swivel float level, encased within a round housing, can be manually adjusted using external knobs to switch orientations between horizontal, vertical, and angled, offering enhanced leveling flexibility. Additionally, this embodiment incorporates an LED flashlight for illumination, a retractable tape measure housed within the device body, extending from the second end, a retractable push pin, operated by a button on the top surface, for temporary wall attachment, and a marking implement integrated into the device for precise marking, enhancing the tool's utility in various construction and decor applications.

Beyond its primary functionalities, the tool is engineered to support a broad spectrum of construction and home improvement tasks, significantly expanding its utility. This device serves as a torpedo level equipped with either standard dual float levels for precise horizontal and vertical alignment, or an alternative model featuring a swivel float level that adjusts to accommodate both alignments dynamically. Its rectangular design ensures stable positioning on any flat surface, enhancing leveling accuracy. The integrated retractable tape measure offers convenience and precision, simplifying the task of measuring distances in compact spaces. This versatile design not only aids in locating structural elements like studs by detecting nails or screws but also facilitates precise leveling and alignment during installations or constructions, making it an indispensable tool for both professional and home settings. The device includes Neodymium magnets on the bottom surface for secure magnetic attachment to metal objects, enhancing its functionality as a comprehensive construction aid.

Moreover, the stud finder offers enhanced leveling capabilities with either traditional dual float levels for horizontal and vertical alignment, or an alternative model featuring an adjustable swivel float level. These level devices, positioned on the top surface of the device, are crucial for ensuring precise leveling in various construction tasks. Whether employed as an independent torpedo level or combined with the stud finding function, each model provides reliable accuracy in indicating stud direction and facilitating other leveling activities. This flexibility in design allows for tailored application in both professional projects and home improvement efforts, ensuring the stud finder's adaptability to a range of environments and requirements.

A notable addition to this stud finder is an LED flashlight arranged near the laser head. This flashlight can operate independently, providing illumination in low-light conditions, enhancing visibility during measurement or marking tasks.

Another innovative feature is the retractable push-button soft cloth tape measure, which extends from the opposite end of the laser and LED flashlight. This tape measure retracts into the body, offering a compact and convenient measuring tool integrated within the device.

Additionally, the tool includes a marking implement housed in a dedicated compartment, ensuring it is readily accessible for precise marking when needed. This integrated marking feature further enhances the utility of the tool, making it indispensable for accurate layout and marking tasks in various construction and decor applications.

Centrally located on the body of the stud finder is a retractable push pin, actuated by a top-mounted button. This pin allows the user to temporarily affix the stud finder to a wall, facilitating hands-free use for leveling or marking, independent of the magnetic feature. The retractable nature of the pin, controlled by a spring mechanism, ensures ease of use and versatility in various construction and home improvement scenarios.

The magnetic laser stud finder measuring device, therefore, combines traditional and novel features to create a multifunctional tool. It supports a wide range of applications, from finding studs to hanging pictures, and from measuring distances to leveling surfaces. This comprehensive functionality addresses the needs of both professional contractors and home users, making it a valuable addition to any tool collection.

BRIEF SUMMARY OF THE INVENTION

In one aspect of the present invention, the tool embodies the functionality of a torpedo level, utilizing its rectangular body design to provide stable and accurate level readings on flat surfaces.

In another aspect, the tool features a swivel float level, which allows for adjustable leveling in multiple orientations, enhancing the tool's utility in diverse measurement and alignment tasks.

In another aspect, the tool integrates orthogonal float level devices on the top surface, providing precise horizontal and vertical leveling for accurate surface alignment.

In a further aspect, the tool includes an integrated LED flashlight, capable of independent operation, enhancing visibility in varying lighting conditions.

In another aspect, a single battery compartment within the device powers both the flashlight and the laser, allowing for their independent or simultaneous use.

In yet another aspect, the tool features a line laser device capable of projecting a single laser line for precise leveling and alignment.

In an additional aspect, the tool is capable of projecting a cross-line laser, offering enhanced versatility in stud finding and surface leveling applications.

In a further aspect, the integration of Neodymium magnets within the bottom surface of the tool facilitates magnetic attachment to metal studs or objects, aiding in stud detection.

In another aspect, the tool comprises a battery compartment that powers the integrated laser device, enabling its functionality for stud finding and leveling tasks.

In a subsequent aspect, the design of the tool accommodates rechargeable batteries, promoting sustainability and convenience in the operation of the laser device.

In another aspect, the tool is equipped with a dedicated charging port, facilitating easy and efficient charging of the integrated rechargeable batteries, enhancing convenience and ensuring continuous operation.

In another aspect, the tool integrates a retractable tape measure, which extends from the device body, providing convenient measuring capabilities alongside its other functions.

In another aspect, the tool incorporates a push button mechanism for the tape measure, enabling quick and controlled retraction to streamline measuring tasks and enhance user convenience.

In a further aspect, the tape measure includes a locking mechanism that maintains its extension and enables automatic retraction with a subsequent pull action.

In another aspect, the invention features a retractable push pin mechanism, operated by a top-mounted button, allowing for secure temporary attachment to surfaces.

In an additional aspect, the tool includes a removable battery cover, facilitating easy access for battery replacement and maintenance.

In another aspect, the tool incorporates a marking implement within a dedicated compartment, enhancing functionality for precise and convenient surface marking.

In a final aspect, the tool integrates an LED flashlight, which can be independently operated to illuminate work areas, enhancing the tool's utility in various environments.

The foregoing has outlined rather broadly the features and technical advantages of the present invention in order that the detailed description of the invention that follows may be better understood. Additional features and advantages of the invention will be described hereinafter that form the subject of the claims of the invention.

In a first embodiment of the present invention, a device including a housing, an emitter, a sensor, orthogonal float level device, a light mechanism, a distance measuring device, and a retractable push pin mechanism is provided. The housing forms a device body with a first end, a second end, a top surface and bottom surface. The emitter is mounted within the housing and is configured to project line or cross-beams from the first end of the device body. The sensor is mounted relative to the bottom surface of the device body and is configured to detect studs within a wall. The orthogonal float level devices are located on the top surface. The light mechanism is integrated into the device body configured to provide illumination. The distance measuring device is associated with the second end of the device. The retractable push pin mechanism is configured to temporarily attach the device to the wall.

In a second embodiment of the present invention, a multi-functional construction tool, including a device body, an integrated laser device, Neodymium magnets, orthogonal float level devices, an LED flashlight integrated into the device for illumination, a retractable tape measure extending from the second end of the device body, and a retractable push pin mechanism is provided. The device body has a first end, a second end, a top surface, and a bottom surface and functions as a torpedo level. The integrated laser device is capable of projecting line or cross-line beams from the first end. The Neodymium magnets are embedded within the bottom surface for magnetic stud detection. The orthogonal float level devices are located on the top surface for horizontal and vertical leveling. The LED flashlight is integrated into the device for illumination. The retractable tape measure extends from the second end of the device body. The retractable push pin mechanism is activated by a button on the top surface for temporary surface attachment.

In a third embodiment of the present invention, a device including a housing, an emitter, a sensor, orthogonal float level devices, a distance measuring device, a retractable push pin mechanism, and a removable marking implement is provided. The housing forms a device body with a first end, a second end, a top surface and bottom surface. The emitter includes a laser or light emitting diode, is mounted within the housing and is configured to project line or cross-beams from the first end of the device body. The sensor includes a pair of permanent magnets mounted relative to the bottom surface of the device body and configured to detect studs within a wall. The orthogonal float level devices are located on the top surface to establish for horizontal and vertical leveling. The light mechanism is integrated into the device body and is configured to provide illumination. The distance measuring device is associated with the second end of the device. The retractable push pin mechanism temporarily attaches the device to the wall. The retractable push pin mechanism may include a pin and an activation button located on the top surface and may be spring-loaded for ease of deployment and retraction. The removable marking implement may be integrated into the housing.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

FIGS. 9a-9b illustrate a spliced view of the article of manufacture providing a multi-functional construction tool, split into two halves and oriented vertically to show internal components and their layout.

FIG. 11a-11b illustrate a spliced view of the swivel model of the multi-functional construction tool, presented in an "opened book" style to expose the internal components. 11a displays the internal components of the bottom half, including the laser head, top and bottom Neodymium magnets, laser eye hole, laser compartment, battery compartment, wires from battery to various components, plastic part of the tack, on/off trigger button compartment, and on/off trigger button. 11b displays the top half and features the LED light, along with internal components like the light switch, swiveling float level, float level itself, push button for pin mechanism, torsion spring, tape measure compartment, coiled measuring tape, laser power button, and the tape measure segment protruding from the bottom.

FIG. 12a-12b illustrate a spliced view of the swivel level model of the multi-functional construction tool, presented in an "opened book" style. 12a displays the front face of the top half, featuring the LED light and internal components such as the light switch, the swivel float level with its knobs and housing, the push button for the pin mechanism, the button to retract the tape measure, the laser power button, and the tape measure segment. 12b Displays the bottom half, highlighting the top and bottom Neodymium magnets and the pin hole.

DETAILED DESCRIPTION

Figure 1:
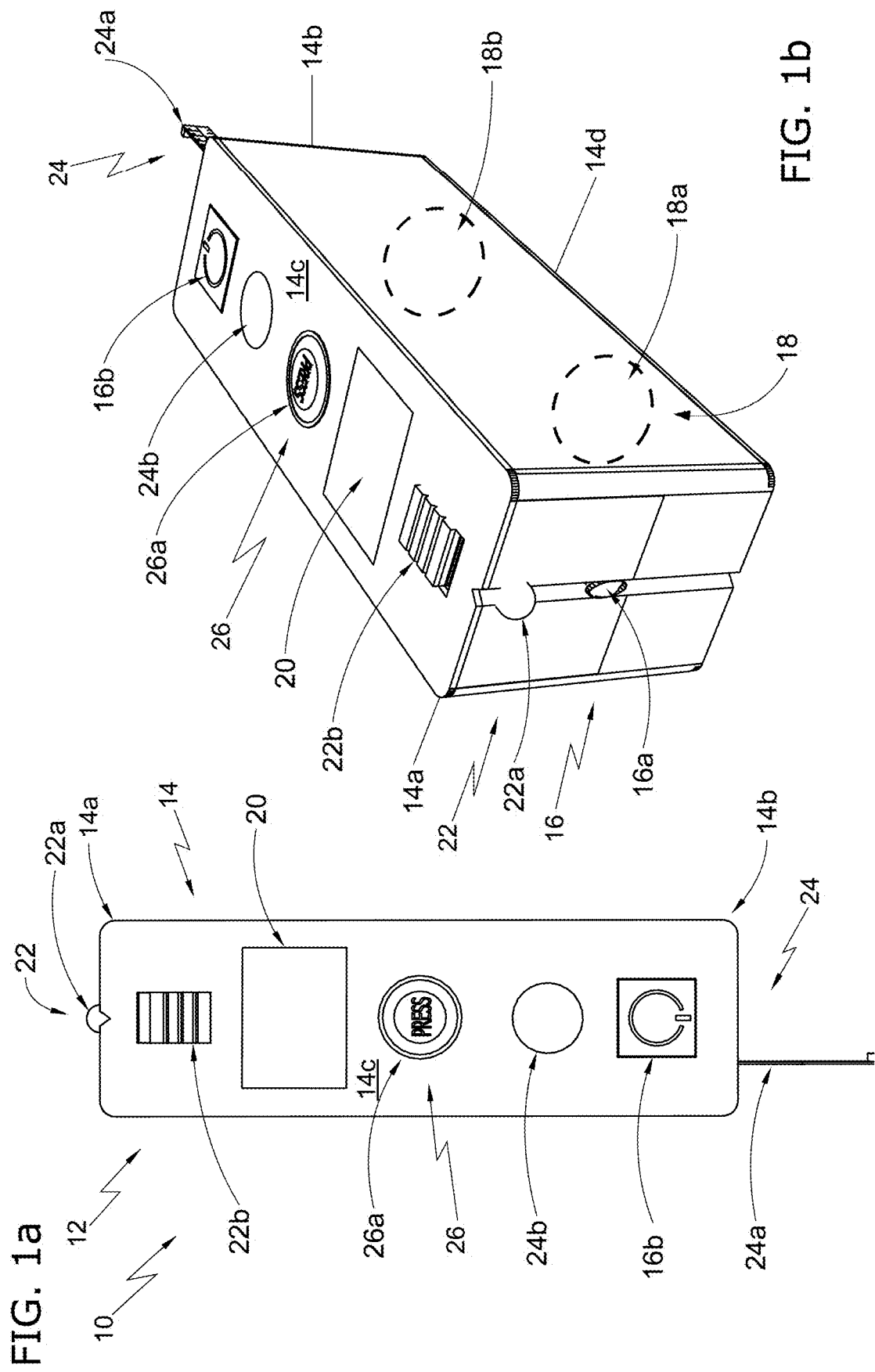
FIG. 1a is an illustration of a multi-functional construction tool according to the present invention.
FIG. 1b is a perspective view of the multi-function construction tool of FIG. 1.

This application pertains to an advanced article of manufacture for a multifunctional construction aid device, namely, a comprehensive magnetic laser stud finder equipped with additional features to enhance its utility and performance.

The detailed descriptions of the present invention's various embodiments reference associated drawings, where like reference numerals denote like parts and assemblies across different views. These descriptions cover numerous potential embodiments, indicating the invention's breadth as constrained by the ensuing claims.

Terminological clarity is maintained throughout this document, with singular terms encompassing their plural counterparts unless contextually limited. Lists of items or elements are to be interpreted individually, ensuring no element is deemed equivalent to another within a list by mere group presentation.

The verbiage "comprises," "comprising," "includes," and "including" denotes inclusion of stated features, steps, or components and allows for additional elements. Execution of depicted functions or acts may deviate from the illustrated sequence, adhering to practical or operational necessities.

Here, "individual" and "user" signify any entity, such as a person, using the innovative magnetic laser stud finder. The term "user" may refer to single or multiple entities.

The "invention" or "present invention" corresponds to the innovative magnetic laser stud finder with comprehensive features, as detailed in this patent application.

To elucidate, the ensuing discussion elaborates on the enhanced magnetic laser stud finder, integrating all enumerated features for a holistic understanding of the invention's capabilities and structure . . . .

With reference to the drawings, and in operation, the present invention relates to a device or multi-functional tool 10. In one aspect of the present invention, the multi-functional tool 10 primarily functions as a stud finder and incorporates additional complimentary devices.

With reference to FIGS. 1a and 1b, the device 10 includes a housing 12 forming a device body 14, an emitter 16, a sensor 18, orthogonal float level devices 20, a light mechanism 22, a distance measuring device 24, and a retractable push pin mechanism 26. The device body 14 may include a first end 14a, a second end 14b, a top surface 14c, and a bottom surface 14d.

As shown, the emitter 16 may be mounted within the housing 12 and may be configured to project a line or cross-beams from the first end 14a of the device body 14. The emitter 16 may include a laser or a light emitting diode 16a and an on/off switch 16b embedded or positioned within the top surface 14a of the device body 14.

The sensor 18 may be mounted near or relative to the bottom surface 14d of the device body 14. The sensor 18 is configured to detect studs within a wall. In the illustrated embodiments, the sensor 18 includes a pair of Neodymium magnets 18a/b. In use, the user may slide the tool 10 along the wall. When the magnets 18a/b are in close proximity to a nail (used, for example, to hang drywall to the studs), the magnets 18a/b will be magnetically attracted to the nail(s) which may be sensed by the user, thereby indicating the presence of a stud behind the drywall.

Other embodiments, may utilize other types of sensors to detect studs within a wall, for example, electronic sensor configured to detect changes in the density of wall (or objects behind dry wall).

The orthogonal float level devices 20 may be located on the top surface 14a of the device body and are configured to establish horizontal and vertical leveling. In first embodiment, the orthogonal float level devices 20 may be attached to a swivel device (see below) that may be moved or rotated by the user between at least two positions. The swivel device may be rotated among or between a plurality of predetermined locations (relative to the body 14). In a second embodiment the orthogonal float level devices 20 may include first and second float level devices (see below) fixedly attached to the top surface 14a.

The light mechanism 22 may be integrated into the device body 14 and configured to provide illumination. In the illustrated embodiment, the light mechanism 22 includes a light emitting diode 22a and an on/off switch 22b.

The distance measuring device 24 may be associated with (or located at) the second end 14b of the device body 14b. In the illustrated embodiment, the distance measuring device 24 is a tape measure 24a. A release button 24b may be provide to lock/release the tape measure 24a into/from position. In other embodiments, the distance measuring device 24 may include a digital distance measuring device (not shown).

The retractable push pin mechanism 26 may be configured for temporarily attaching the device or tool 10 to the wall. As described in further detail below, the retractable push pin mechanism 26 may include at least one retractable pin (see below) and an actuation button 26a.

With reference to FIGS. 2-17, the first and second embodiments, including the swivel orthogonal float level devices and the fixed orthogonal float level devices, will now be discussed in detail.

The stud finder body 900 features an integrated line laser 201 for wall projection, managed by an on/off switch 501. Its operation is supported by a rechargeable battery within compartment 801. The device's magnetic functionality is provided by Neodymium magnets 701a-b located on the back surface 900b. For precise leveling, it is equipped with dual float levels, 401a and 401b, or a swivel float level 405, which includes knobs 405a-b for adjustment between horizontal and vertical positions.

A user can pinpoint a vertical stud's location by sliding the device along a wall, with the Neodymium magnets 701a-b detecting metal fasteners in the drywall. When the device adheres magnetically, it reveals the stud's position. For precise marking or temporary wall attachment when magnetic attachment isn't feasible, the user can deploy the push pin mechanism 101. Activating the push pin places a small, temporary mark for reference or secures the device to the wall at a specific location. The laser, activated by the push button 501, then projects a line indicating the stud's path. Level accuracy is enhanced by the swivel float level 405, facilitating exact alignments as required.

The tape measure feature, denoted as 601, consists of an internal spool 601a and a segment of the tape measure 601b, visibly extending from the device to showcase its functionality. In one version, the tape measure is seamlessly retracted by a torsion spring 602, ensuring easy and reliable measurement capabilities. This model includes a push button 604 to retract the tape measure manually. In another version, the tape measure retracts automatically without the need for a button, utilizing the same torsion spring mechanism for smooth operation.

The device employs a push pin mechanism, comprising a push pin 102 (tack) with a plastic part 102a and a metal pin part 102b, deployed by pressing the push button 101, and retracted by a spring 103, for temporary wall attachment.

The battery compartments for the laser 801 and light 303, along with comprehensive wiring 802a-f, ensure sustained power supply and functional integration of all electrical components.

Given its multifaceted design, the device serves not only as a laser stud finder but also as a versatile tool for various construction and home improvement applications, enhancing efficiency and convenience in tasks such as hanging pictures, framing, and interior designing.

The unique assembly of this device is characterized by the union of top and bottom shell splices, as depicted in FIGS. 9a to 11b, which splits the multi-functional construction tool into two halves to showcase the internal layout of components. This design encases the intricate network of parts, maintaining a sleek yet robust structure that is conducive to both professional and DIY usage. With its innovative blend of features, including various operational modes detailed across FIGS. 1 to 17, this advanced stud finder sets a new standard in the realm of construction aid devices. It exemplifies versatility, precision, and user-friendly operation, making it an indispensable tool for a wide range of construction and home improvement tasks.

Further elaborations, depicted through subsequent figures and descriptions, continue to unravel the multifaceted nature of this invention, delving into the specifics of its operational mechanisms and user-centric design. As we move forward, additional illustrations and narratives will further expound on the intricate workings and applications of this novel device, affirming its position as a pivotal innovation in the construction and home improvement domain.

Figure 2:
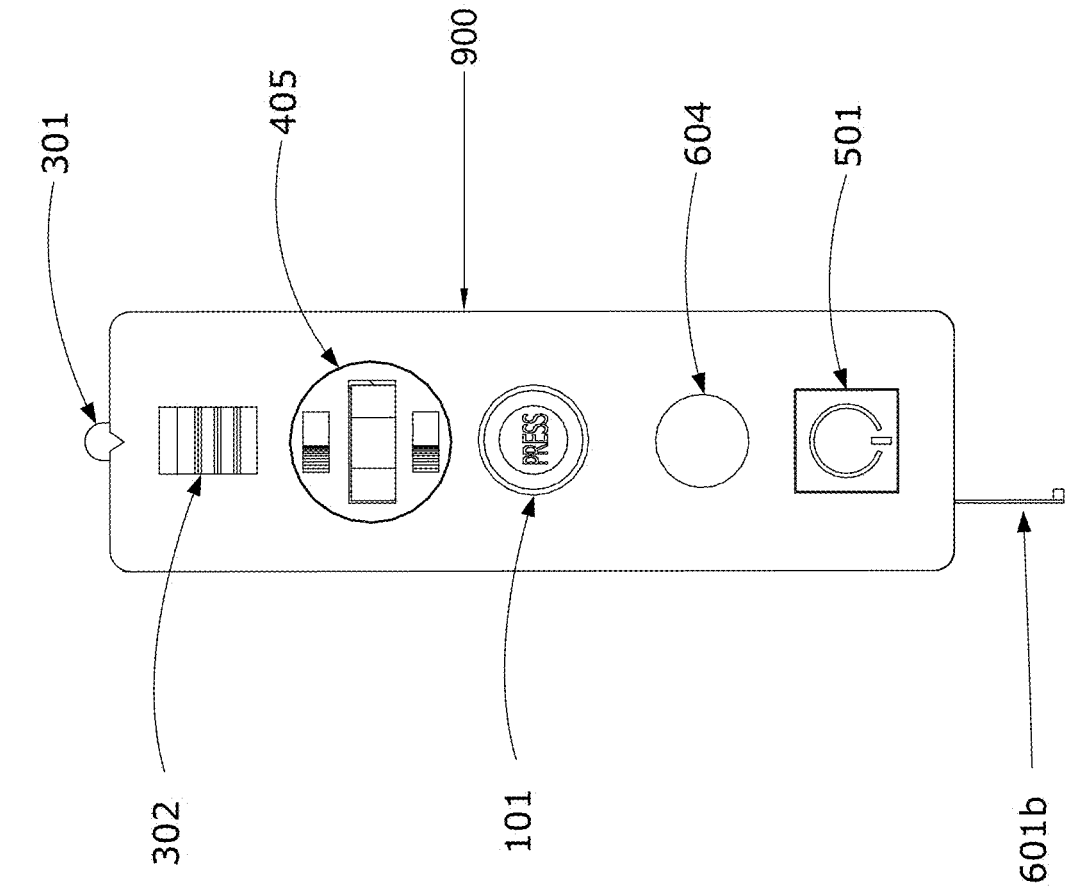
FIG. 2 illustrates a front view of the multi-functional construction tool, featuring an adjustable swivel float level, an LED light, a light switch, a push button for the pin mechanism, a button for tape measure retraction, a laser power button, and the tape measure segment visibly extending from the bottom.

FIG. 2 displays a front view of the swivel version of the multi-functional construction tool, oriented vertically as it would appear when positioned against a wall for stud finding. At the top middle of the unit, the LED light 301 protrudes subtly from the top face, serving to illuminate the work area effectively. Directly below this, the light switch 302 is strategically placed to allow for easy operation of the LED light. Progressing downward, the swivel float level 405 is centrally located, enabling the user to adjust for precise horizontal or vertical alignments. Positioned at the center of the unit's interface, the push button 101 for the pin mechanism is designed for easy access and operation. Below this, the button to retract the tape measure 604 offers additional functionality for measuring tasks. Near the bottom of the unit's interface, the laser power button 501 is conveniently located for quick activation of the laser feature. Extending visibly from the bottom of the unit, the tape measure segment 601b highlights the tool's capability to provide extended measurements, enhancing its utility for various construction tasks.

Figure 3:
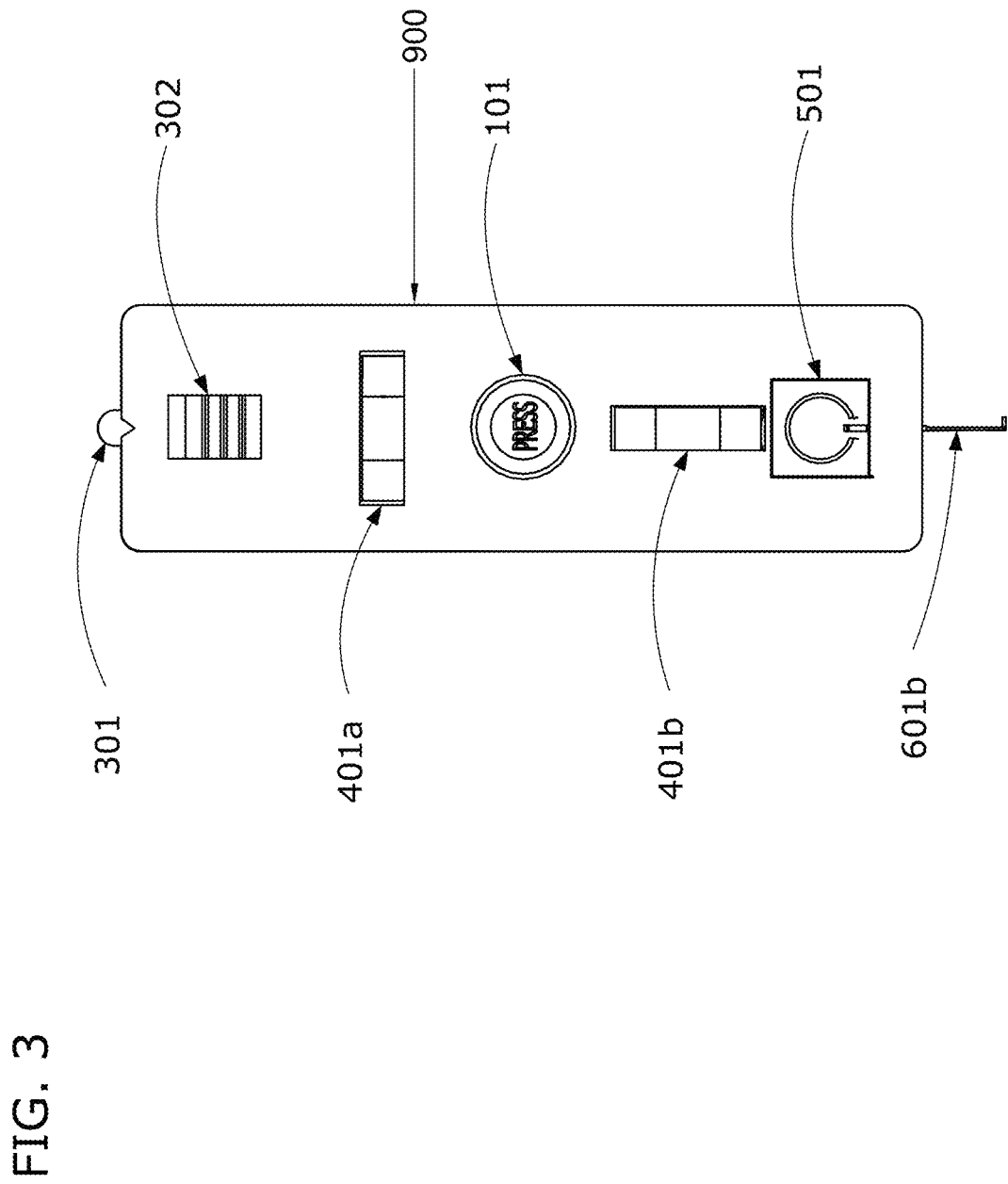
FIG. 3 illustrates a front view of the dual level version of the multi-functional construction tool, featuring the LED light, light switch, horizontal and vertical float levels, push button for pin mechanism, laser power button, and the tape measure segment.

FIG. 3 presents a front view of the dual level version of the multi-functional construction tool, designed for precise leveling and measurement tasks. At the very top, the LED light 301 is seen protruding, providing essential illumination for operations in various lighting conditions. Below the light, the light switch 302 is conveniently positioned at the top of the front face, enabling easy control of the LED light. As we move further down the front face, the horizontal float level 401a is located, followed by the push button 101 for the pin mechanism, allowing for straightforward and precise operation. Positioned below the push button, the vertical float level 401b aids in achieving accurate vertical alignments. The laser power button 501 is situated near the bottom of the interface, placed strategically for quick activation. Extending from the bottom of the tool, the tape measure segment 601b demonstrates the tool's extended measuring capabilities, integral for comprehensive construction tasks.

Figure 4:
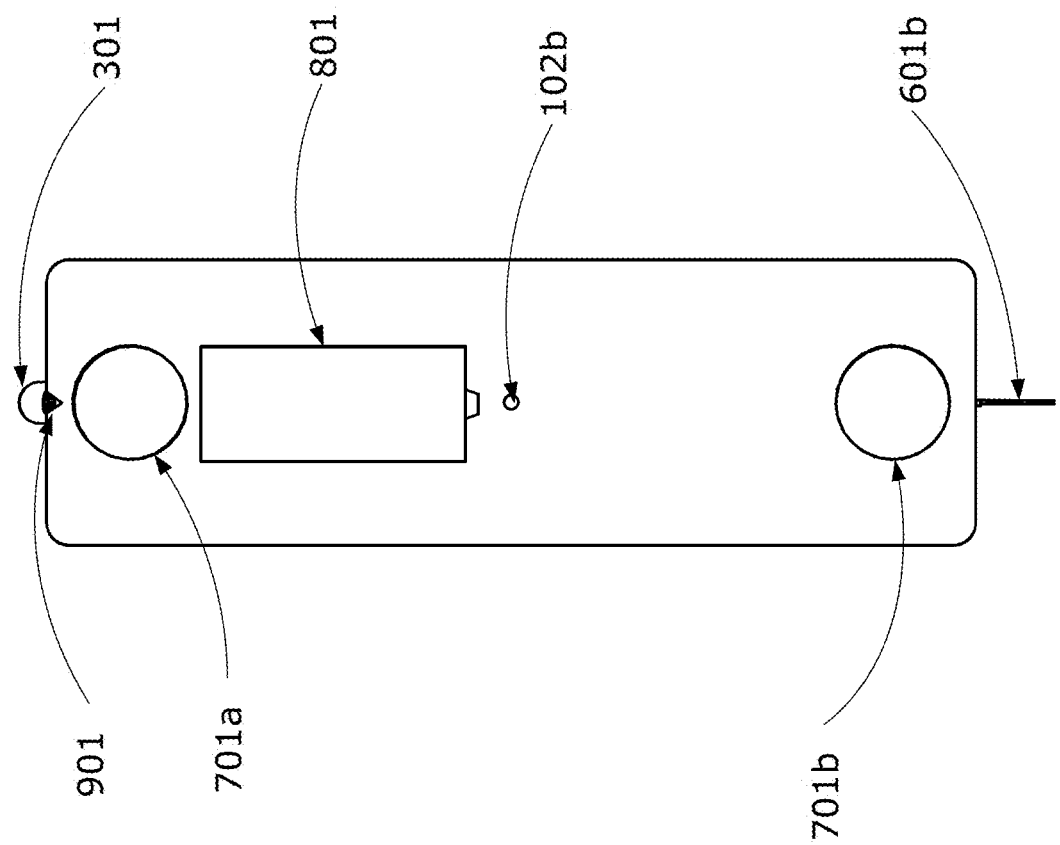
FIG. 4 illustrates a back view of the multi-functional construction tool, showing the LED light, laser eye hole, top and bottom Neodymium magnets, battery compartment, metal pin part of the tack, and the tape measure segment extending from the bottom.

FIG. 4 illustrates a back view of the multi-functional construction tool as seen from the surface it is placed against. The LED light 301, protruding from the top, ensures that the work area behind the tool is well illuminated. Below the LED light, the top Neodymium magnet 701a is positioned to enhance the tool's magnetic functionality, allowing it to adhere securely to metallic surfaces. Further down, the battery compartment 801 is centrally located, ensuring easy access for battery replacement or charging. Near the middle of the back face, the metal pin part of the tack 102b is shown, integral to the tool's pin mechanism for marking or temporary attachment. Below this, the bottom Neodymium magnet 701b mirrors the top magnet, providing additional magnetic stability. Extending visibly from the bottom of the unit, the tape measure segment 601b emphasizes the tool's capability to provide measurement from the back side, useful for diverse measuring scenarios.

Figure 5:
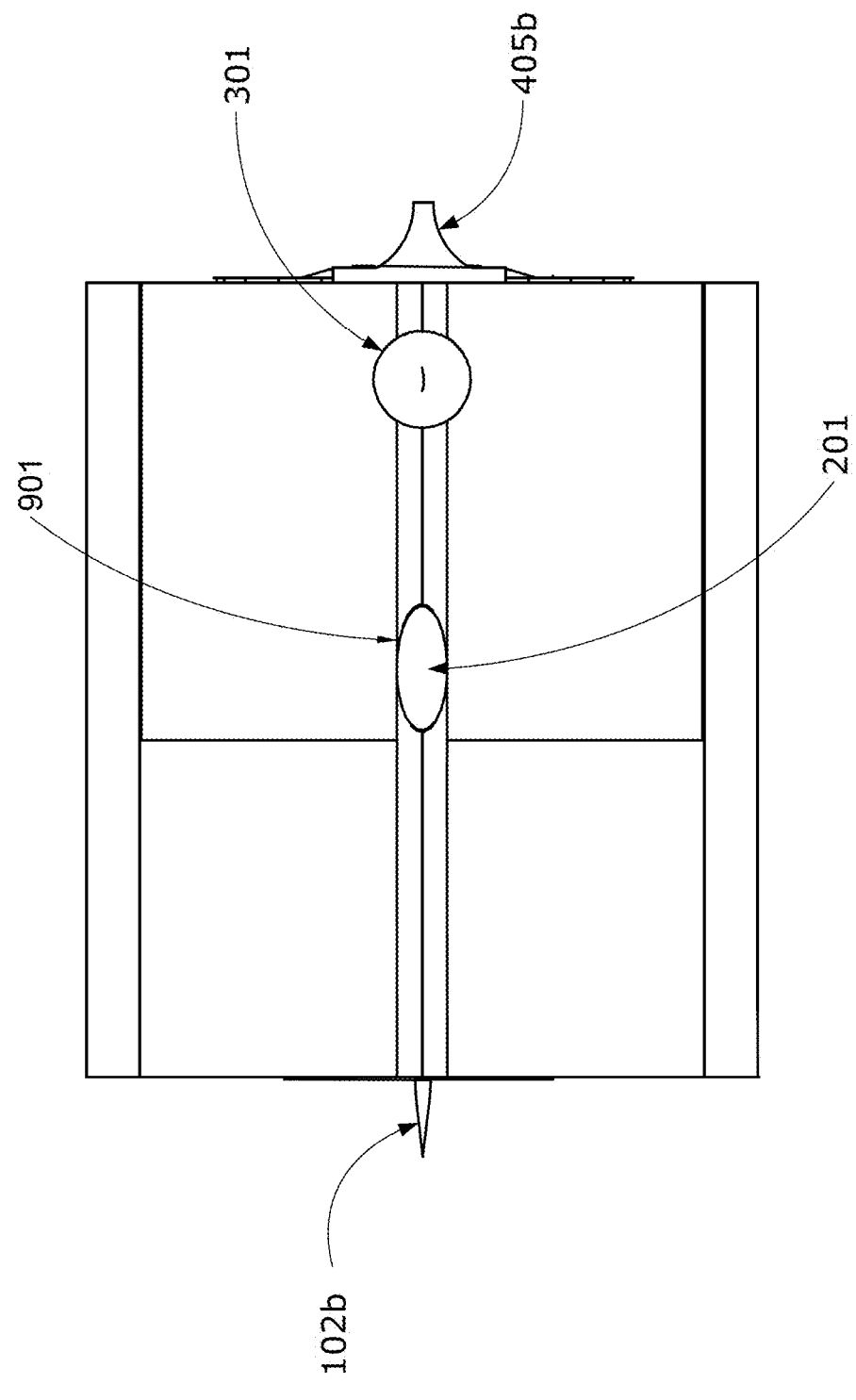
FIG. 5 illustrates a top-down perspective view of the multi-functional construction tool, showcasing the metal pin part of the tack, the laser head, the LED light, and one of the float level swivel knobs.

FIG. 5 provides a top view of the multi-functional construction tool, offering a unique perspective on the arrangement of key components. On the left side of the top surface, the metal pin part of the tack 102b is prominently visible, protruding as if the button has been activated, ready to be pressed into the wall. Centrally located on the top surface are the laser head 201 and laser eye hole 901, and then to the right, the LED light 301, strategically placed for optimal functionality. Protruding from the front surface of the unit, the swivel knob 405b for the swivel float level is also seen. This knob allows the user to adjust the float level easily, enhancing the tool's capability for precise leveling in both horizontal and vertical planes.

Figure 6:
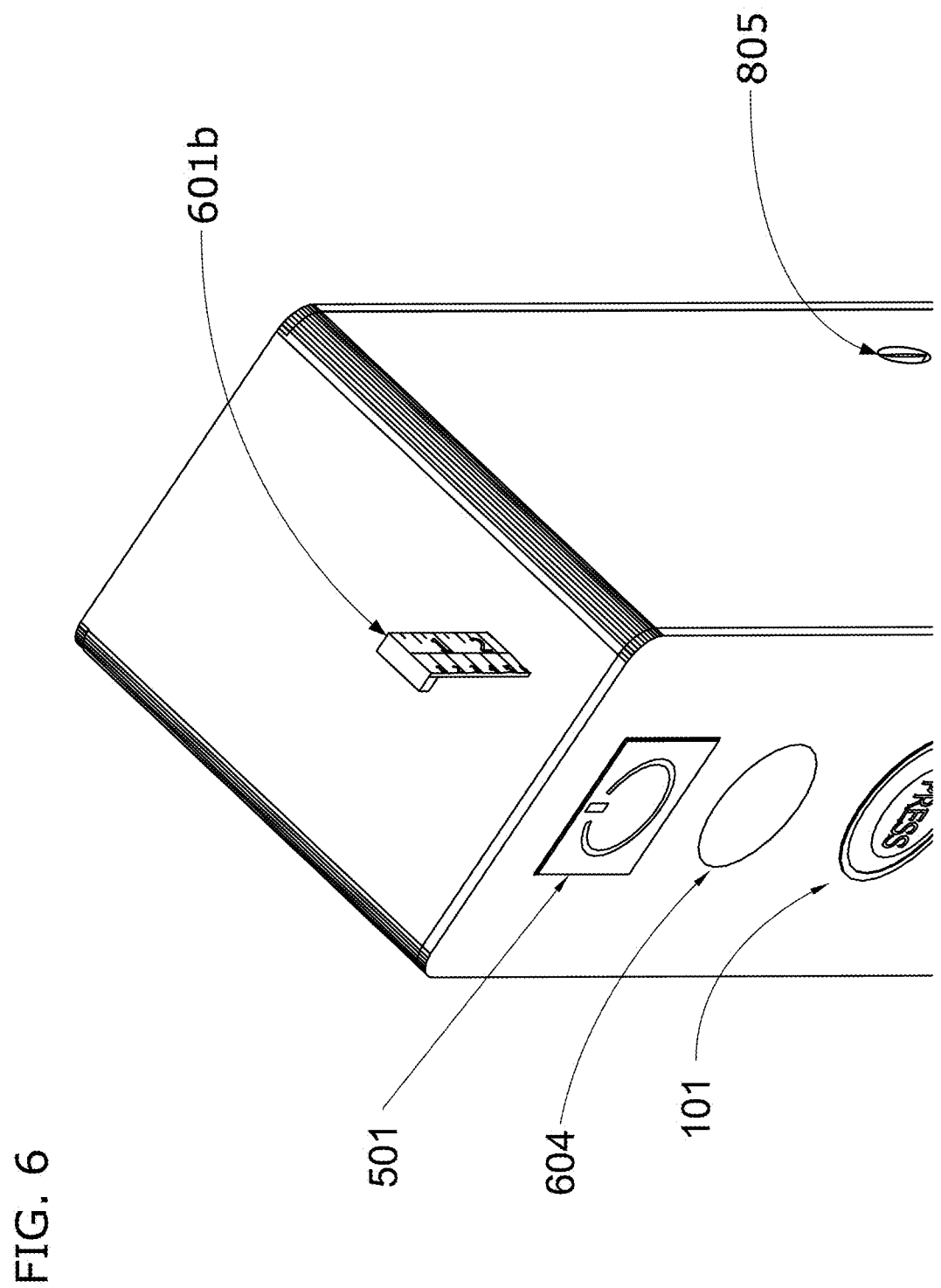
FIG. 6 illustrates a bottom view, angled to also reveal the front and bottom segments of the multi-functional construction tool, showing the tape measure segment, laser power button, push button to retract the tape measure, push button for the pin mechanism, and the charging port.

FIG. 6 provides a bottom view of the multi-functional construction tool, uniquely angled to reveal not only the bottom surface but also parts of the front and left faces of the unit. This perspective showcases the tape measure segment 601b as the sole feature on the bottom, extending visibly and highlighting its accessibility for measuring tasks. Viewed from this angle on the bottom of the front face are the laser power button 501, the button to retract the tape measure 604, and the push button for the pin mechanism 101, all strategically placed for easy user interaction and functionality. Additionally, on the left face visible from this angle, the charging port 805 is shown, providing convenient access for powering the device. This comprehensive view underscores the tool's design for practicality and ease of use in various construction and measurement scenarios.

Figure 7:
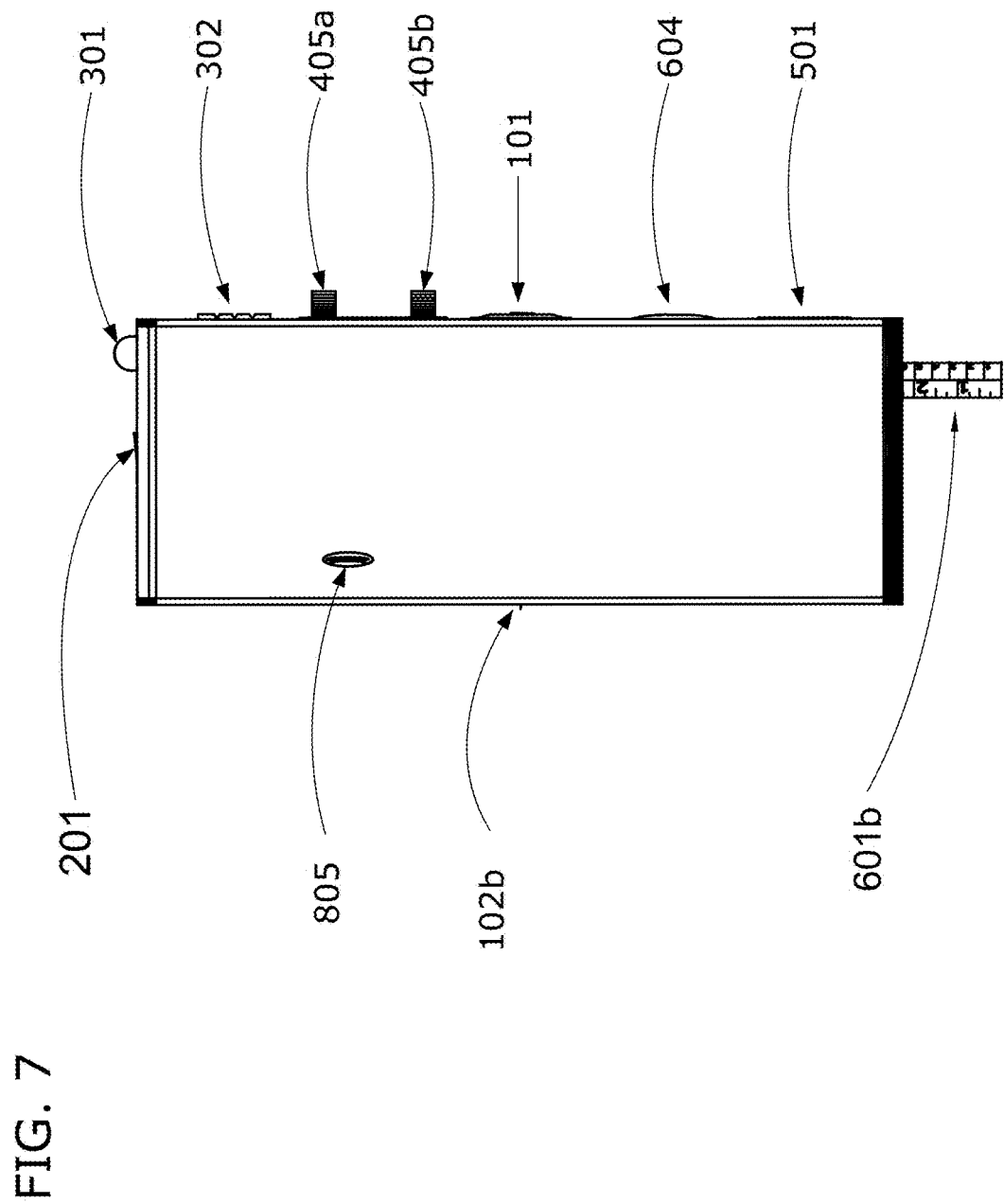
FIG. 7 illustrates a left side view of the multi-functional construction tool, displaying the LED light, light switch, swivel knobs for the float level, charging port, push pin, push button for pin mechanism, push button to retract the tape measure, laser power button, and the tape measure segment.

FIG. 7 provides a left side view of the swivel level model of the multi-functional construction tool. This perspective highlights several key components positioned for operational efficiency. At the top of the device, the laser head 201 and the LED light 301 are visible, indicating their placement for optimal function and ease of access. The only feature on the left face is the charging port 805, positioned for easy connectivity.

From the front face, various controls protrude in a logical sequence for user interaction. Starting at the top, the light switch 302 is followed by the upper swivel knob 405a and the lower swivel knob 405b for the swivel float level, allowing for precise level adjustments. Centrally located is the push button 101 for the pin mechanism, which is flanked below by the button to retract the tape measure 604 and the laser power button 501 at the bottom. Extending from the bottom of the unit, the tape measure segment 601b is also visible, emphasizing the tool's comprehensive measuring capabilities. This arrangement underscores the tool's design for practicality and ease of operation in a variety of construction scenarios.

Figure 8:
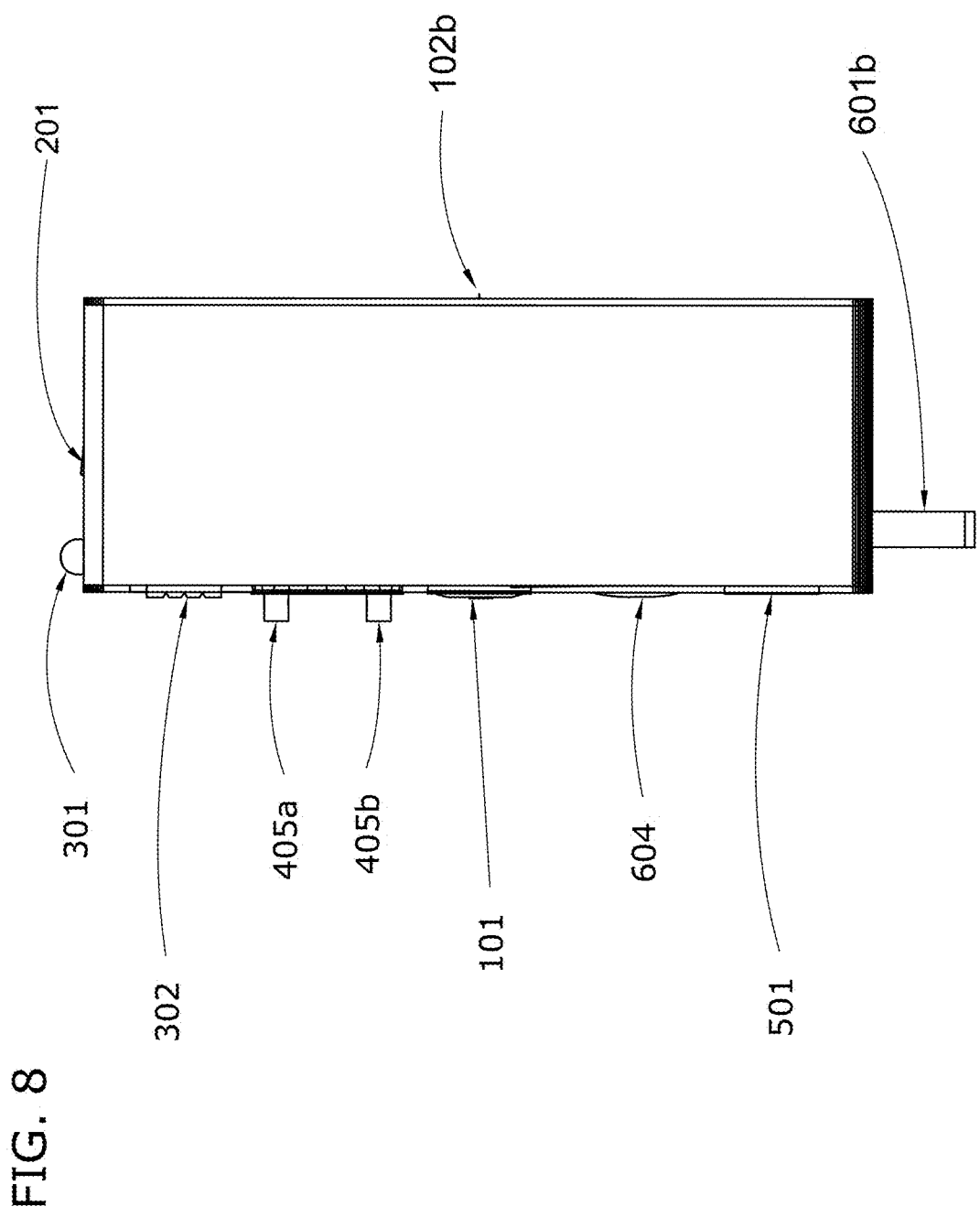
FIG. 8 depicts a right-side view of the multi-functional construction tool, showcasing the LED light, light switch, swivel knobs for the float level, push button for pin mechanism, push pin, push button to retract the tape measure, laser power button, and the tape measure segment.

FIG. 8 presents a right side view of the swivel level model of the multi-functional construction tool, complementing the perspectives provided in previous figures. This view emphasizes the strategic placement of components for user accessibility and functionality. At the top, the LED light 301 is seen protruding, designed to enhance visibility in varied working conditions.

From the front face, several key features are sequentially displayed and easily accessible. At the top, the light switch 302 is positioned for convenient operation of the LED light. This is followed by the swivel knobs 405a and 405b, which allow for adjustments of the swivel float level to achieve precise alignment in both horizontal and vertical orientations. Central to the device's interface is the push button 101 for the pin mechanism, ideally located for straightforward activation. Also seen protruding from the right side, which corresponds to the back surface of the unit, is the metal pin part of the tack 102b, indicating its readiness for use. Below the central features, the button to retract the tape measure 604 and the laser power button 501 are situated near the bottom, enabling easy reach and operation. Protruding from the bottom of the unit, the tape measure segment 601b is visible, underscoring the tool's readiness for measuring tasks, making it a versatile aid in construction and home improvement projects.

FIGS. 9a-9b illustrate a spliced view of the dual level model of the multi-functional construction tool, split into two halves as if a book was opened from the left face of the unit and oriented vertically. This view exposes the internal components and their layout, providing an in-depth look at the device's functionality.

FIG. 9a displays the bottom half of splice (950b), and the components are arrayed vertically, beginning at the top with the niche groove 902, which enhances the structural aesthetics and design. Below this, the laser compartment 200 and the laser head 201 are placed internally, centralizing the core functionality for line projection. Further down, the battery compartment 801 is shown, crucial for powering the device. Centered within this half is the plastic part of the tack 102a, integral to the push pin mechanism. The arrangement also displays various wires 802a-d, illustrating the electrical connections that facilitate power and control between the components. Near the bottom, the bottom Neodymium magnet 701b is visible, enhancing the tool's magnetic adherence capabilities, flanked by the on/off trigger button compartment 503 and the on/off trigger button 502 for the laser.

FIG. 9b displays the top half of splice (950a), and starting from the top, the LED light 301 protrudes, signifying its position for optimal illumination. Below this, the light switch 302 and the battery compartment for the light 303 are either visible at the top or placed internally, supporting lighting functions. The horizontal float level 401a is also shown, essential for ensuring accurate level adjustments. The push button 101 for the pin mechanism is centrally located, offering ease of use. Progressing downwards, the tape measure compartment 603 houses the coiled measuring tape 601a and is assisted by the torsion spring 602 for smooth retraction, culminating with the laser power button 501 and the extended tape measure segment 601b at the very bottom. This layout underscores the tool's comprehensive capabilities and its design for robust, multifunctional use in construction settings.

Figure 10B:
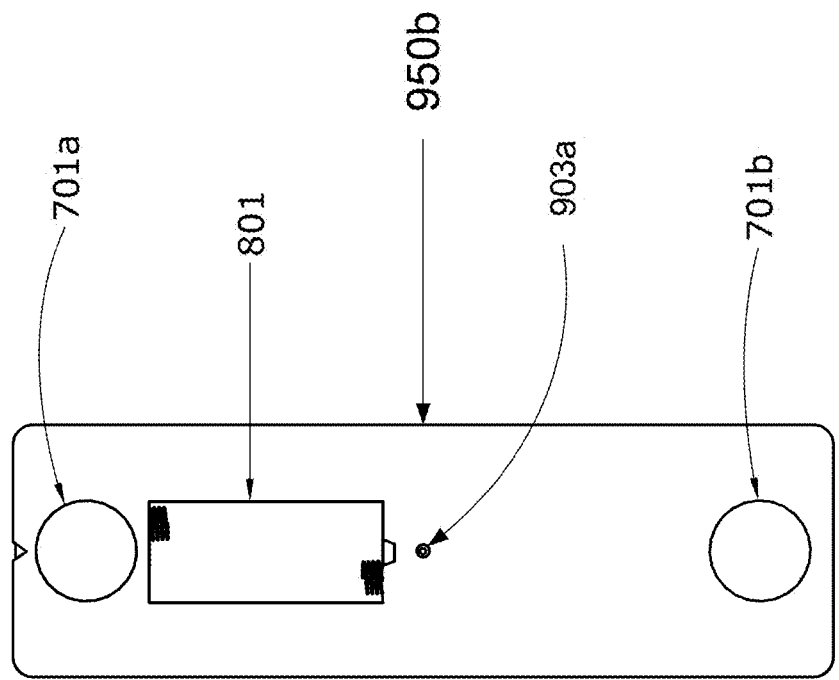
FIG. 10a-10b illustrate a spliced view of the dual float level model of the multi-functional construction tool, resembling the covers of an opened book. 10a displays the front face of the top half, featuring the LED light, light switch, horizontal and vertical float levels, push button for pin mechanism, laser power button, and the tape measure segment. 10b displays the bottom half, highlighting the top and bottom Neodymium magnets, battery compartment, and the pin hole.
Figure 10A:
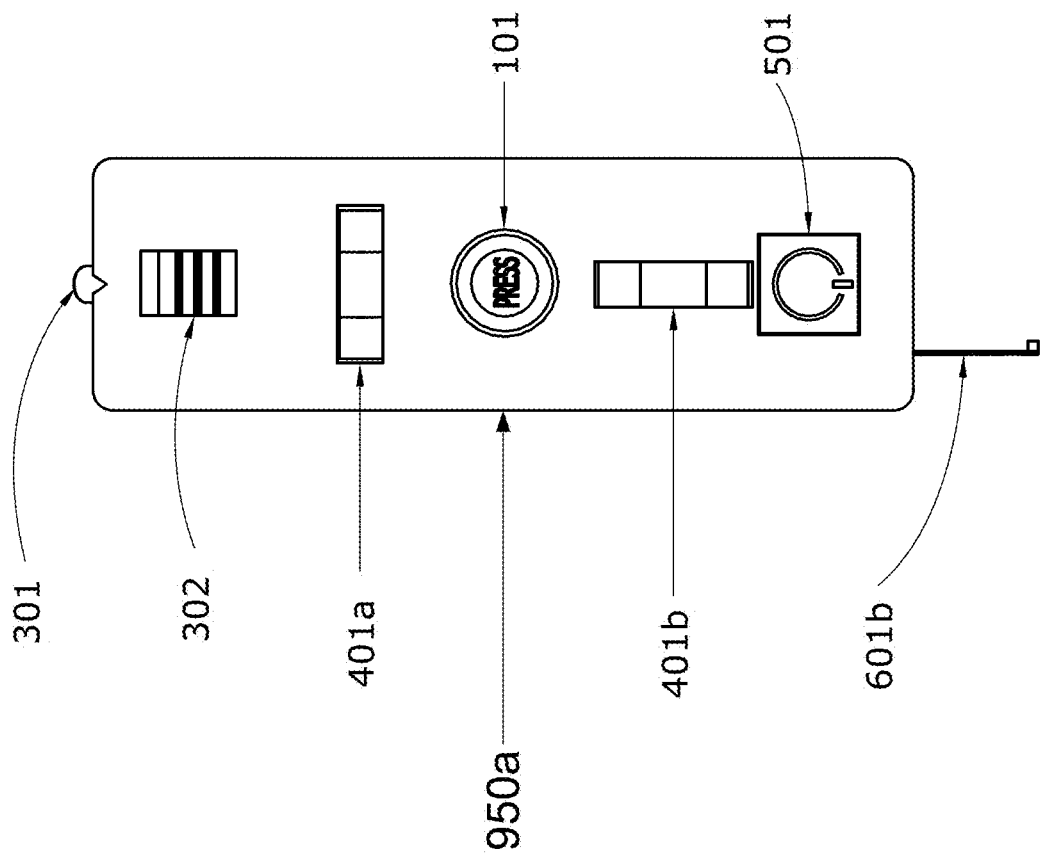

FIGS. 10a-10b provide a spliced view as if FIGS. 9a-9b were viewed from the opposite side, showcasing the front and back surfaces effectively. This perspective allows for a comprehensive understanding of the external and internal component placements, specifically designed for enhanced utility and operational efficiency.

FIG. 10a displays the top half of the splice (950a). The arrangement begins at the top with the LED light 301, which protrudes from the top of the unit, offering critical illumination. Below the light, the light switch 302 is accessible on the front surface, followed by the horizontal float level 401a and the push button 101 for the pin mechanism, centrally positioned for easy usage. Further down the front face, the vertical float level 401b is located, enhancing the device's capacity for precise vertical alignment. At the bottom of this side, the laser power button 501 is strategically placed for quick activation, with the tape measure segment 601b extending visibly from the bottom of the unit, indicating its functionality for extended measurements.

FIG. 10b illustrates the bottom half of the splice (950b), and back surface components from the top downwards. At the top, the top Neodymium magnet 701a is placed, providing strong magnetic adherence to metal surfaces. Below this, the battery compartment 801 is shown, crucial for housing the power source. Centered in this splice is the pin hole 903a, designed for precise marking or through-hole functionalities. The bottom Neodymium magnet 701b, positioned at the bottom, mirrors the top magnet to stabilize and secure the tool against metallic structures.

FIGS. 11a-11b illustrates a spliced view of the swivel model of the multi-functional construction tool, similar to FIG. 8 but including additional features like the swivel level, charging port, and connections involving the laser and flashlight. The view is presented in an "opened book" style, slightly angled to show the top and left face of the bottom half (900b), and the top and right faces for the top half (900a), providing a comprehensive internal and external component overview.

FIG. 11a displays the bottom half of splice (900b), the arrangement begins at the top with the laser eye hole 901, prominently placed. Below this, internally, are the top Neodymium magnet 701a and the laser compartment 200 with the laser head 201 positioned for optimal operational functionality. The wiring for the neutral and hot lead wires 802e-f is visible, illustrating the electrical connectivity. The charging port 805 is accessible on the left face, enhancing the device's utility. Further down internally, the battery compartment 801 is shown, crucial for powering the device. Centered within this section is the plastic part of the tack 102a, integral to the device's pin mechanism. Additional wiring 802a-d extends downwards, culminating near a crescent formation of the bottom Neodymium magnet 701b, with the on/off trigger button compartment 503 and the on/off trigger button 502 positioned above it for laser operation.

FIG. 11b displays the top half of splice (900a), and starts at the top with the LED light 301 protruding for enhanced illumination. Below this, internally, the light switch 302 is located, followed by the swivel float level 405 with the float level 406 positioned horizontally within it, facilitating precise level adjustments. The centered middle showcases the backside of the push button 101 for the pin mechanism, strategically placed for easy accessibility. Further down, the tape measure compartment 603 houses the coiled measuring tape 601a and the torsion spring 602, essential for the tape measure's retractability. At the bottom, the laser power button 501 and the tape measure segment 601*b* are visible, completing the tool's functional features.

FIGS. 12*a*-12*b* present a spliced view, similar to FIGS. 10*a*-10*b* but depicting the front and back surfaces as if the model were flipped or viewed from behind. This perspective is particularly useful for examining both the external features and the placement of internal components as they appear on opposite sides of the tool.

FIG. 12*a* displays the top half of the splice (900*a*), beginning at the top with the LED light 301, which protrudes to provide effective illumination. Below this, on the front face, the light switch 302 is the first component encountered, facilitating easy activation of the LED light. This is followed by the comprehensive swivel float level assembly which includes the swivel knobs 405*a* and 405*b*, and the swivel housing 405*c*, with the actual float level 406 housed within, allowing for precise and adjustable leveling. In the center of this front face, the push button 101 for the pin mechanism is conveniently located for user access, with the button to retract the tape measure 604 just below it. At the bottom of the interface, the laser power button 501 is positioned for easy reach, and the tape measure segment 601*b* protrudes from the bottom, highlighting its functionality for extended measurement.

FIG. 12*b* displays the bottom half of the splice (900*b*), and showcases a simpler arrangement with the top Neodymium magnet 701*a* positioned at the top of the back face. Below this, the pin hole 903, with the metal pin part of the tack 102*b* centered within it, is strategically positioned to facilitate precise marking or tacking the unit against the wall, allowing for hands-free operation by securely adhering the tool in place. At the bottom, the bottom Neodymium magnet 701*b* mirrors the top magnet, ensuring stable magnetic attachment to metal surfaces, enhancing the tool's utility in various construction scenarios.

Figure 13:
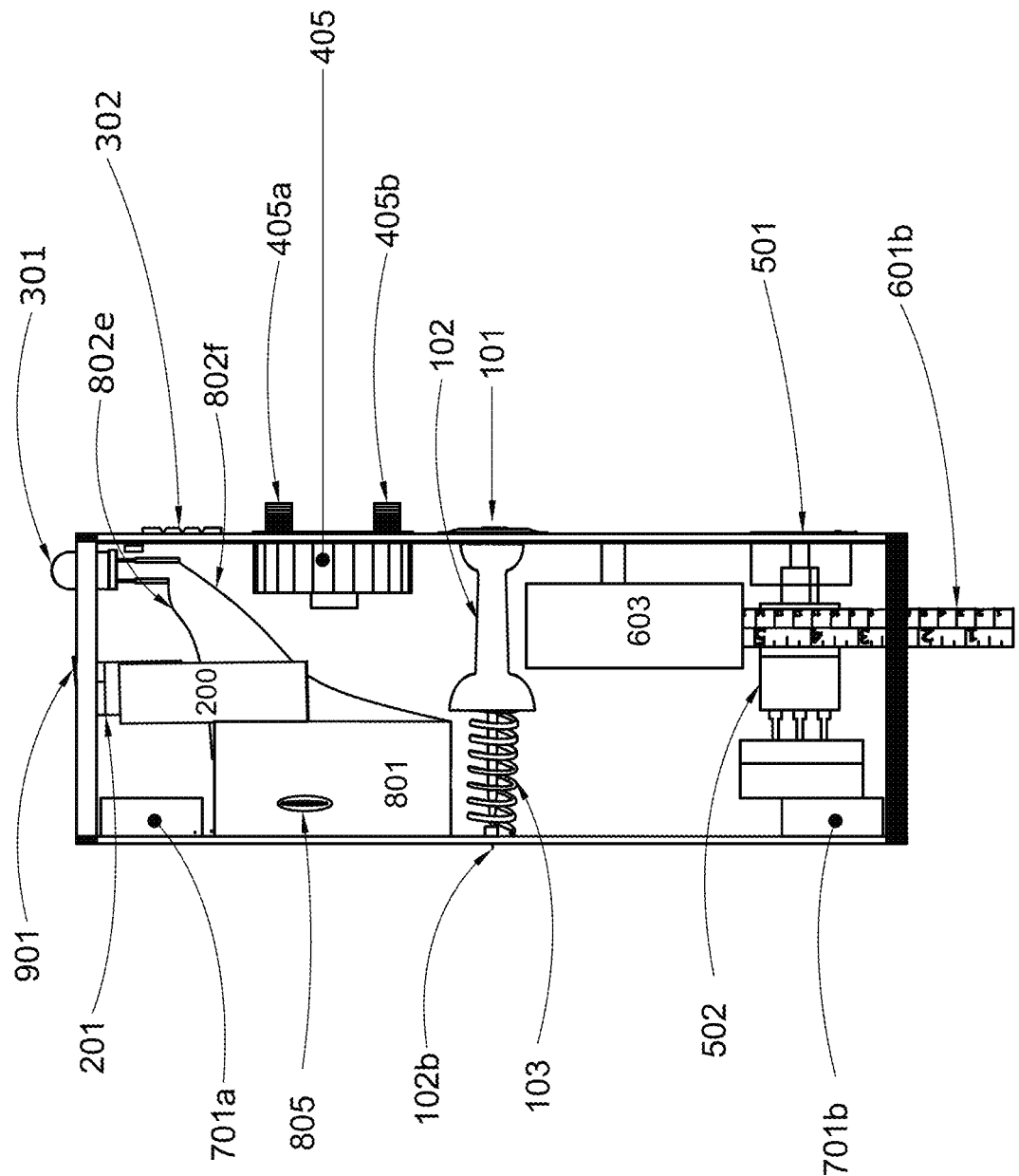
FIG. 13 illustrates a left side view of the swivel model of the multi-functional construction tool, with the left side of the shell removed to expose the internal components. This view shows the LED light, laser head, laser compartment, neutral and hot lead wires, light switch, swivel float level and its knobs, push button for the pin mechanism, push pin and spring, tape measure compartment, on/off trigger button, laser power button, top and bottom Neodymium magnets, and the tape measure segment extending from the bottom.

FIG. 13 illustrates a left side view of the swivel version of the multi-functional construction tool, with the left side face of the shell removed to reveal internal components not visible in previous splice views. This vertical shot provides an in-depth look at the intricate arrangement of parts within the unit.

At the top of the unit, the LED light 301 and the laser eye hole 901 are prominently displayed, indicating their positions for optimal functionality. Internally, starting down the left side, the top Neodymium magnet 701*a* is positioned near the top, followed by the charging port 805 situated on the battery compartment 801, highlighting the integration of power management components.

Centered on the left side are the spring 103 and the metal pin part of the tack 102*b*, both crucial for the push pin mechanism, with the pin 102*b* protruding slightly, ready for engagement. Further down, centrally at the bottom, the on/off trigger button 502 is seen, with the bottom Neodymium magnet 701*b* located at the very bottom of the left side, ensuring the device's magnetic adherence capabilities.

Internally, other components without specific directional arrows include the laser compartment 200, another instance of the battery compartment 801, and the tape measure compartment 603, arrayed from top to bottom, providing a clear view of their spatial relationships within the device.

On the right side, starting from the top, the neutral and hot lead wires 802*e-f* are located above the light switch 302, illustrating the electrical pathways. Below this, the swivel float level 405 with its knobs 405*a-b* is strategically positioned for easy adjustment. Below these, the push pin mechanism, represented by the push pin 102 and the push button 101, is visible with both components slightly protruding from the front face, indicating their readiness for use. Near the bottom, the laser power button 501 is conveniently placed for activation, with the tape measure segment 601*b* visibly exiting from the bottom face of the unit.

Figure 14:
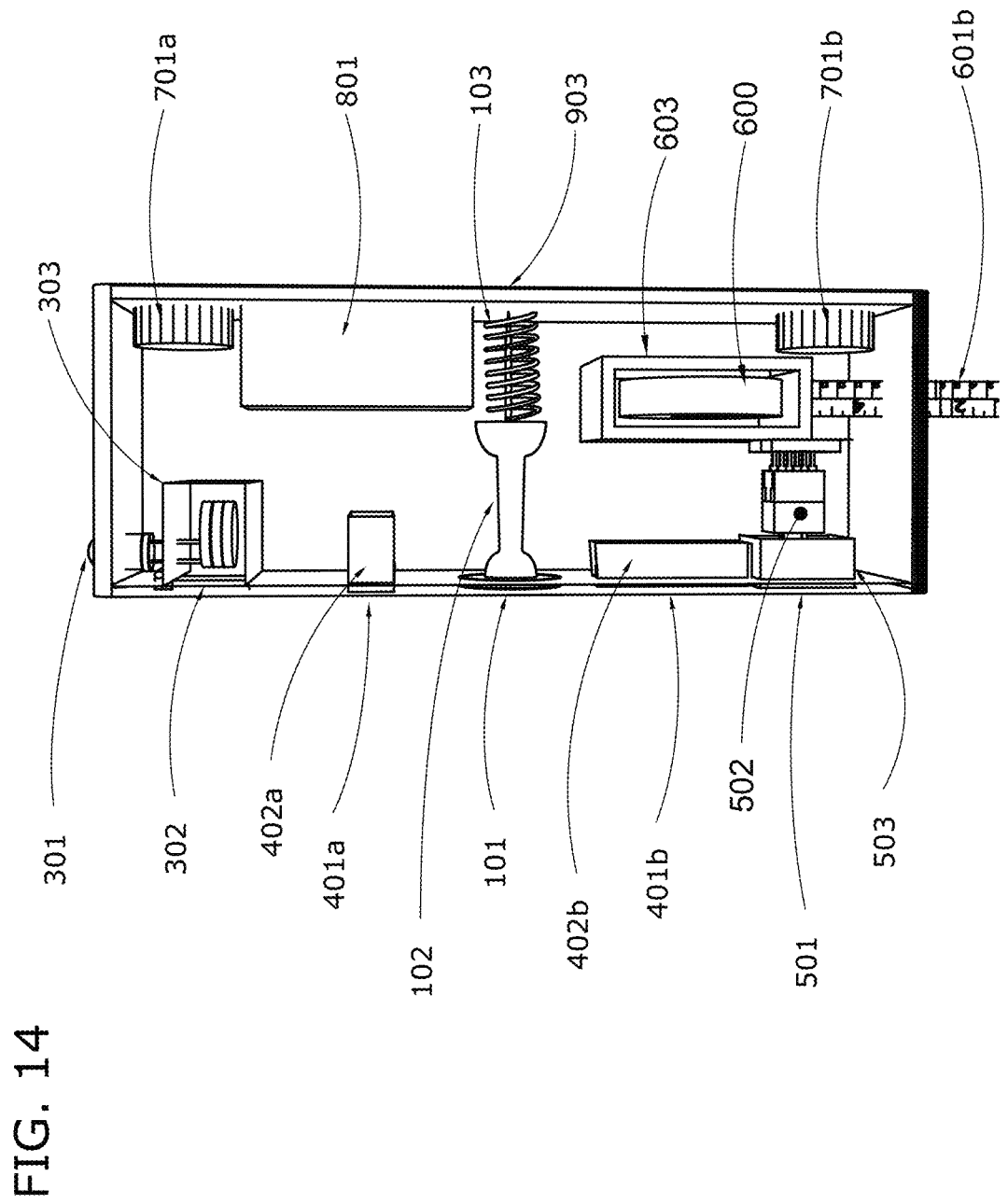
FIG. 14 illustrates a right side view of the dual level model of the multi-functional construction tool, with the right side of the shell removed to expose the internal components. This view includes the LED light, battery compartment for the light, top and bottom Neodymium magnets, light switch, housings for the horizontal and vertical float levels, main battery compartment, push button for the pin mechanism, push pin and its spring, pin hole in the shell, an unidentified component labeled 600, tape measure compartment, on/off actuator button for the laser, on/off trigger button and its compartment, and the tape measure segment extending from the bottom.

FIG. 14 presents a right side view of the dual level model of the multi-functional construction tool, with the right side face of the shell removed to reveal internal components not visible in previous splice views. This view provides a clear perspective on the organization and accessibility of both external and internal parts, enhancing understanding of the tool's multifunctionality.

At the top of the unit, the LED light 301 protrudes, signaling its placement for effective illumination. Starting down the left side from the top, the light switch 302 is followed by the housing for the horizontal float level 402*a* and the horizontal float level itself 401*a*, both indicated by arrows to denote their position and orientation. Internally, further down, the push pin 102 is positioned, followed by the push button 101 for the pin mechanism on the front face, which is easily accessible for operation. Continuing internally, the housing for the vertical float level 402*b* and the vertical float level 401*b* (not directly visible but indicated) are shown, enhancing the tool's leveling capabilities. Toward the bottom, the on/off trigger button 502 and the laser power button 501, with the on/off trigger button compartment 503 internally positioned below, completing the circuit of operational controls.

On the right side, arrows start at the top with the top Neodymium magnet 701*a*, followed by the battery compartment 801. Then centered right side, the spring 103 and the pin hole 903 are highlighted. Internally positioned further down are the tape measure compartment 603, an unidentified component labeled 600, the bottom Neodymium magnet 701*b*, and finally, the tape measure segment 601*b* exits from the bottom, signifying the end of the tool's comprehensive feature layout.

This detailed portrayal in FIG. 14 not only clarifies the spatial arrangement of each component but also emphasizes the dual level system's integration within the tool, showcasing its advanced capabilities for precise measurement and leveling in construction and home improvement applications.

Figure 15:
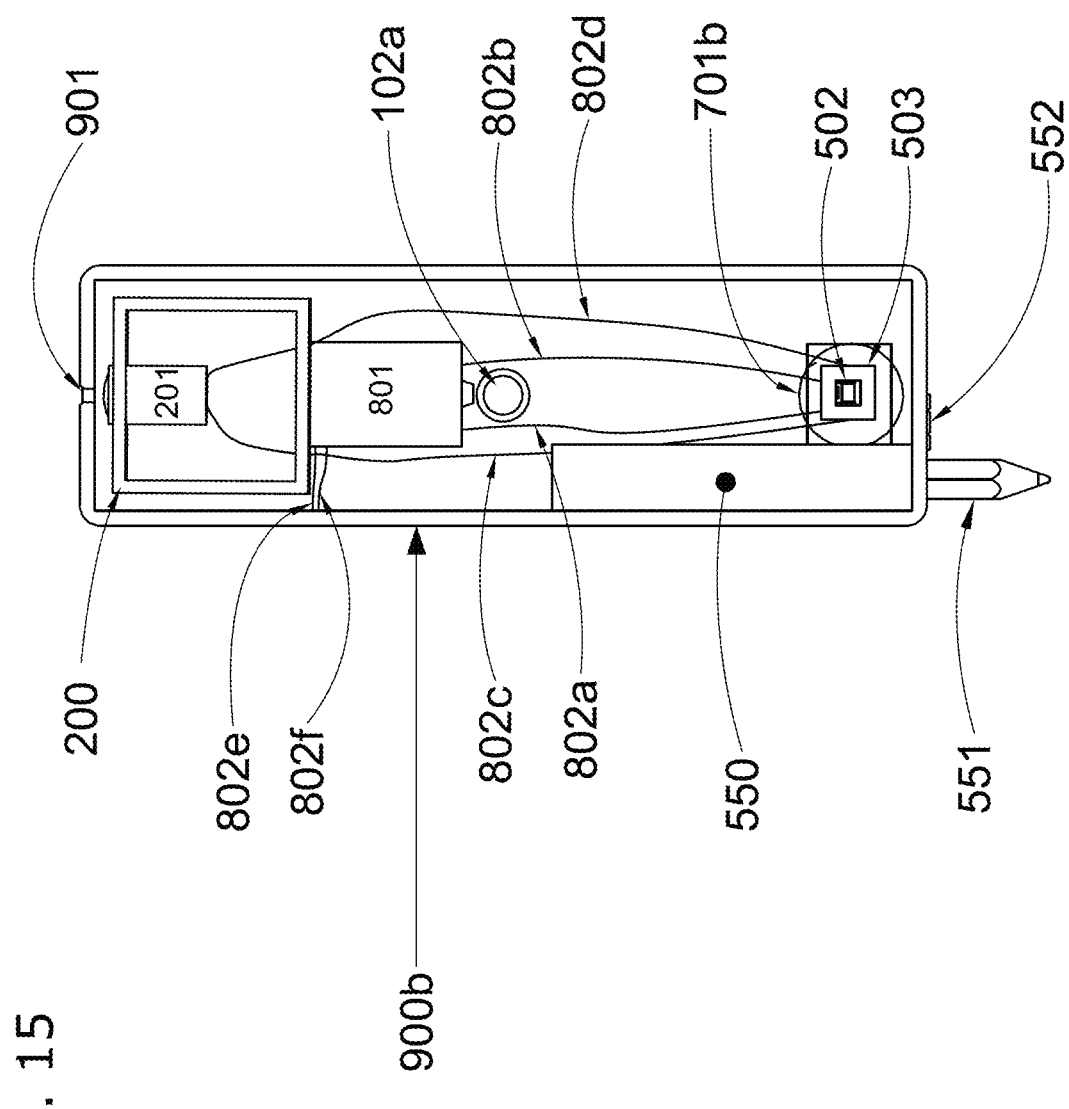
FIG. 15 presents a bottom splice view of the multi-functional construction tool, showcasing a vertical orientation that reveals the internal components of the unit, including the marking implement housed within its dedicated compartment. This perspective highlights how various elements are compactly arranged within the bottom shell, providing insights into the tool's efficient internal architecture and design.

FIG. 15 illustrates a bottom half splice 900*b* of the multi-functional construction tool, providing a vertical display of the unit's internal components; similar to FIG. 11*a*, but it additionally includes the marking implement 551.

At the top, the laser eye hole 901 is prominently featured, directly above the laser compartment 200 that houses the laser head 201. Below, the wires 802*e* and 802*f* connect the charging port to the battery compartment 801, illustrating the essential power routing for charging. In the center, the plastic part of the tack 102*a* is integral to the push pin mechanism. An array of wires 802*a-d* further showcases the electrical integration necessary for the tool's functionality. At the lower left internally, the marking implement compartment 550 houses the marking implement 551, with its compartment cover 552 slightly visible, emphasizing easy accessibility and storage. Positioned at the center bottom, the on/off trigger button 502 and its compartment 503 are displayed with the bottom Neodymium magnet 701*b* located just behind them, enhancing the tool's magnetic functionality and providing operational control.

Figure 16:
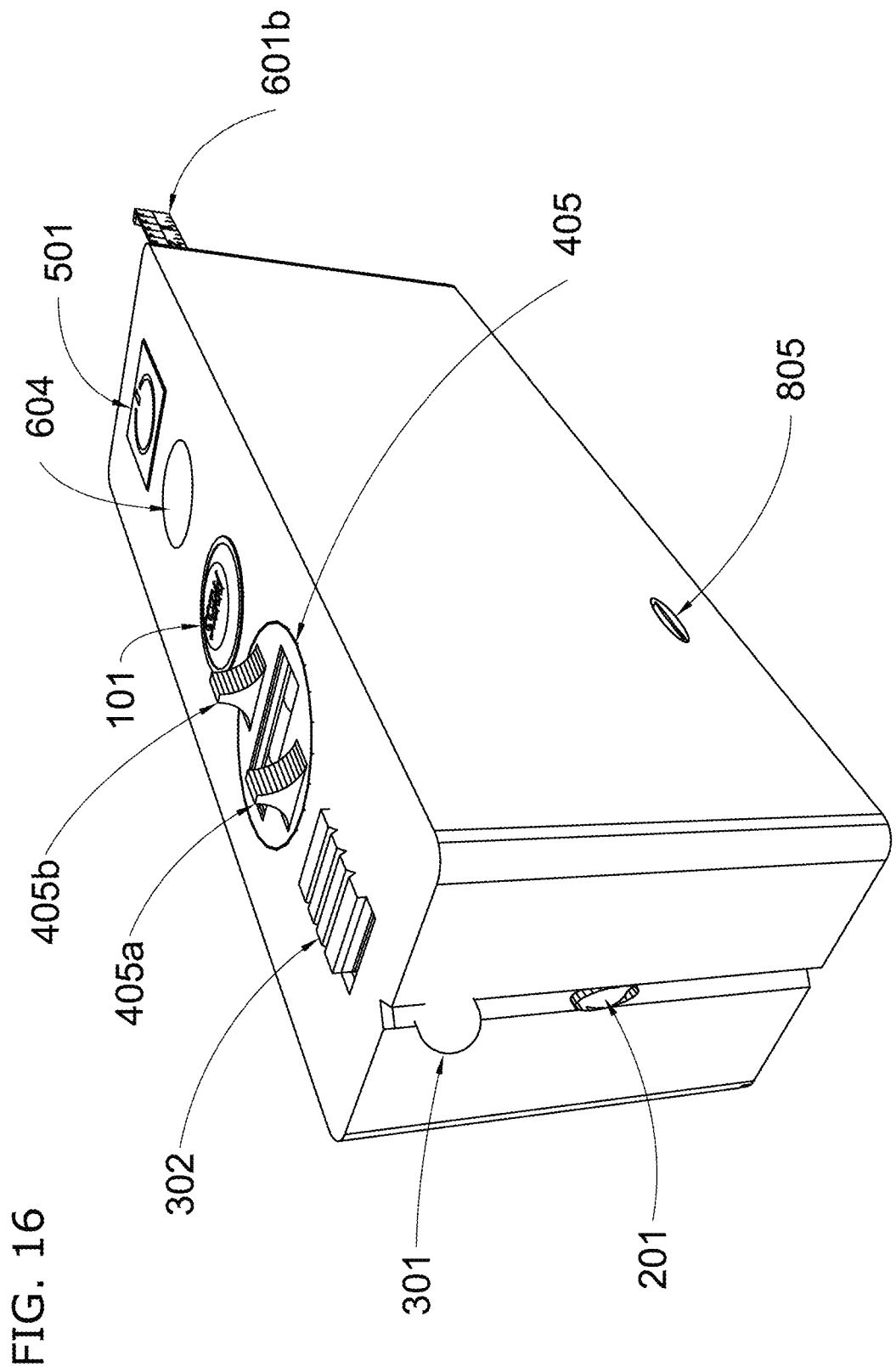
FIG. 16 illustrates an isometric view of the dual level model of the multi-functional construction tool, angled to display the front, top, and left side of the unit. This view showcases the laser head, LED light, light switch, horizontal and vertical float levels, push button for the pin mechanism, laser power button, and the tape measure segment extending from the bottom.

FIG. 16 offers an isometric view of the swivel level model of the multi-functional construction tool, showcasing the front, top, and left side of the unit. This angled view facilitates a clear understanding of the tool's design and functional elements, particularly highlighting the swivel level feature.

On the top face, the laser head 201 and the LED light 301 are visible, positioned to maximize their utility for line projection and illumination. Moving to the front face, the light switch 302 appears first, providing convenient access for controlling the LED light. Directly below, the swivel float level 405 is featured along with its associated knobs, 405a and 405b, which enable precise adjustments between horizontal and vertical orientations. Centrally located on the front face, the push button 101 for the pin mechanism allows for easy deployment of the pin for marking or temporary attachment. Below this, the button to retract the tape measure 604 is situated, enhancing the tool's measuring functionality, with the laser power button 501 positioned at the very bottom of the front face for straightforward laser activation.

On the left side of the unit, the charging port 805 is displayed, ensuring the tool's readiness for recharging as needed. Visible extending from the bottom of the unit, the tape measure segment 601b protrudes, indicating the tool's capability to provide extended measurements.

Figure 17:
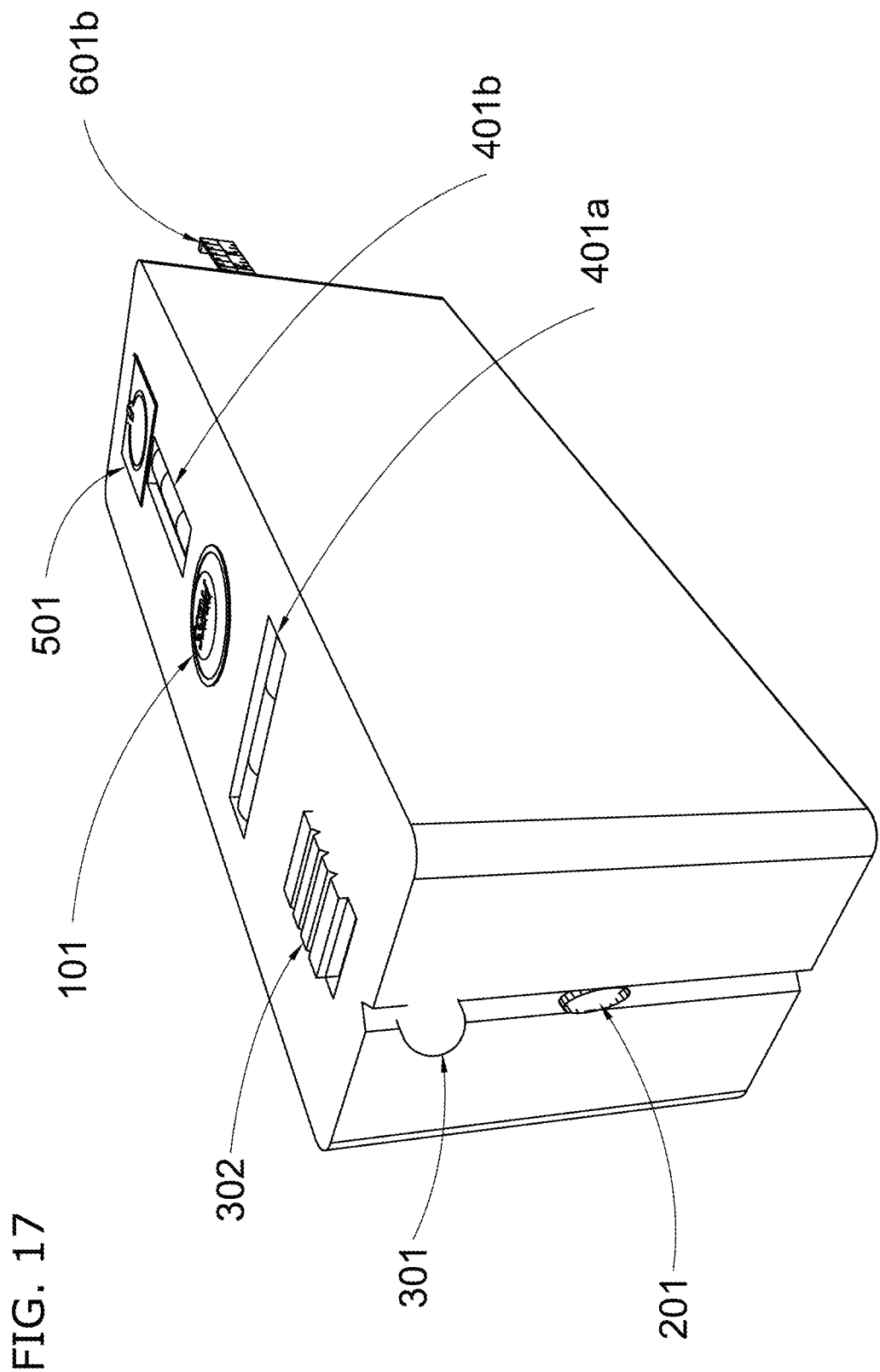
FIG. 17 illustrates an isometric view of the swivel model of the multi-functional construction tool, positioned at an angle to reveal the front, top, and left side of the unit. This view highlights the laser head, LED light positioned on top, the charging port on the left side, light switch, swivel float level with its knobs, push button for the pin mechanism, button to retract the tape measure, laser power button, and the tape measure segment visibly protruding from the bottom.

FIG. 17 provides an isometric view of the dual level model of the multi-functional construction tool, offering a comprehensive perspective by displaying the front, top, and left side of the unit. This angled view enhances visibility of both the operational interface and key components that define the tool's functionality.

On the top surface, the laser head 201 and the LED light 301 are prominently displayed. These features are crucial for ensuring the tool's effectiveness in low-light conditions and for precision in line projection. Moving to the front face of the unit, the light switch 302 is the first component encountered, conveniently placed for easy access and operation of the LED light. This is followed by the horizontal float level 401a, essential for maintaining accurate horizontal alignments. Centrally located on the front face is the push button 101 for the pin mechanism, which allows for simple and effective operation. Below this, the vertical float level 401b aids in ensuring accurate vertical alignments, enhancing the tool's utility for diverse leveling tasks. Positioned at the bottom of the front face, the laser power button 501 is strategically located for quick activation of the laser feature.

Visible from the back and extending downward, the tape measure segment 601b protrudes, signifying the tool's ready capability for extending measurements necessary for comprehensive construction tasks.

This detailed narrative meticulously outlines the stud finder's innovative design, showcasing a tool that integrated traditional functionality with modern advancements. From the intuitive push button 101, which deploys the retractable push pin 102, to the inclusion of a tape measure 601, a flashlight 301, and a swiveling float level 405, each element was thoughtfully designed to enhance user experience and efficiency. Additionally, the incorporation of the marking implement 551 allows for precise, on-the-spot marking, further facilitating ease of use.

Furthermore, the device's functionality as a highly effective torpedo level, ensures accuracy and reliability in construction tasks.

NUMERICAL REFERENCE LIST

10: device or tool
12: housing
14: device body
14a: first end
14b: second end
14c: top surface
14d: bottom surface
16: emitter
16a: light emitting diode
16b: on/off switch
18: sensor
18a: Neodymium magnets
20: orthogonal float level devices
22: light mechanism
22a: light emitting diode
22b: on/off switch
24: distance measuring device
24a: tape measure
24b: release button
26: retractable push pin mechanism
26a: actuation button
101: Push Button (pushes the pin into the surface when pressed)
102: Push Pin (Tack)
102a: Plastic part of tack
102b: Metal pin part of tack
103: Spring (springs pin back into housing. coils around metal part of pin in shell of unit)
200: Laser Compartment (housing that holds laser in shell of device)
201: Laser Head
301: Lightbulb
302: Switch (turns light on/off)
303: Battery Compartment for light
401: Float levels
401a: Horizontal float level (top level)
401b: Vertical float level (bottom level)
402a: Horizontal float level housing
402b: Vertical float level housing
405: Swiveling float level
405a: Float level swivel knob (top)
405b: Float level swivel knob (bottom)
405c: Swivel float level housing
406: Float level
501: on/off actuator button for laser
502: on/off trigger button for laser
503: on/off trigger button compartment
550: Marking implement compartment
551: Marking implement
552: Marking implement compartment cover
601: Tape Measure
601a: Coiled measuring tape
601b: Measuring tape extension
602: Torsion Spring (retracts tape measure)
603: Tape Measure Compartment
604: Push Button (to retract tape measure)
701: Neodymium Magnets
701a: Top Neodymium Magnet
701b: Bottom Neodymium Magnet
801: Battery Compartment
802: wires
802a: Battery to on/off button
802b: on/off button to battery
802c: on/off button to laser
802d: Laser to on/off button
802e: Neutral lead wire
802f: Hot lead wire
805: Charging Port
900: Unit shell for swivel level
900a: Top half of splice for swivel level model

900*b*: Bottom half of splice for swivel level model
900*c*: Top view of shell
901: Laser eye hole on unit shell
902: Niche groove
903: Pin hole in shell
950: Unit shell for dual levels
950*a*: Top half of splice for dual level model
950*b*: Bottom half of splice for dual level model The invention illuminates a transformative approach in construction tool design, marrying fundamental stud finding capabilities with extended features like measuring and illumination, heralding a new era in construction and remodeling tools. This account emphasizes the stud finder's role as a beacon of innovative engineering, providing a comprehensive solution to the multifaceted needs of construction and renovation projects. By transcending the traditional boundaries of stud finding and leveling tools, this device represents a significant advancement in construction aid technology, offering a versatile, user-friendly, and sophisticated tool that sets a new standard in the industry.

What is claimed:

1. A stud finder device, comprising: a rectangular housing forming a device body with a first end, a second end, a top surface and bottom surface;
   an emitter comprising a laser mounted within the housing and configured to project line laser beams or cross-beams from the first end of the device body;
   a sensor comprising at least one permanent magnet mounted relative the bottom surface of the device body and configured to detect studs within a wall;
   orthogonal float level devices on the top surface configured to establish for horizontal and vertical leveling;
   a light mechanism integrated into the device body configured to provide illumination; a distance measuring device associated with the second end of the device; and
   a retractable push pin mechanism for temporarily attaching the device to the wall, wherein:
   the emitter comprises a light emitting diode and the sensor comprises at least two Neodymium permanent magnets;
   the retractable spring-loaded push pin mechanism comprises a pin and an activation button located on the top surface of the housing;
   the orthogonal float level devices are integrated into a single device configured to be adjusted relative to the body; and
   a LED flashlight integrated into the device body.

2. The stud finder device, as set forth in claim 1, the sensor includes at least a pair of permanent magnets.

3. The stud finder device, as set forth in claim 1, wherein the distance measuring device is a digital tape measure or a retractable tape measure.

4. The stud finder device, as set forth in claim 1, further comprising a removable marking implement integrated into the housing.

5. A multi-functional construction tool, comprising:
   a rectangular device body with a first end, a second end, a top surface, and a bottom surface, functioning as a torpedo level;
   an integrated laser device capable of projecting line or cross-line beams from the first end;
   Neodymium magnets embedded within the bottom surface for magnetic stud detection;
   orthogonal float level devices on the top surface for horizontal and vertical leveling;
   an LED flashlight integrated into the device body for illumination;
   a retractable tape measure extending from the second end of the device body; and
   a retractable spring-loaded push pin mechanism configured to be activated by a button on the top surface for temporary surface attachment,
   an emitter comprising a light emitting diode and a sensor comprising at least two Neodymium permanent magnets; and
   a plurality of orthogonal float level devices integrated into a single device configured to be adjusted relative to the devise body.

6. The tool of claim 5, wherein a retractable tape measure is integrated into the device body, extending from the second end to facilitate distance measurements.

7. The tool of claim 6, wherein the retractable tape measure includes a locking mechanism to maintain its extension and allows for automatic retraction with a subsequent action.

8. The tool of claim 6, further comprising a rechargeable battery compartment within the device body, powering the laser, flashlight, and electronic components.

9. The tool of claim 6, wherein the integrated LED flashlight is positioned to provide illumination in various working conditions.

10. The tool of claim 9, wherein the LED flashlight is designed to operate independently of the laser, with variable brightness settings.

11. The tool of claim 6, wherein the retractable push pin mechanism is configured for enabling hands-free use during construction and leveling tasks.

12. The tool of claim 11, where the retractable push pin mechanism is further configured to facilitate temporary attachment of the tool to surfaces for hands-free operation.

13. The tool of claim 6, wherein the Neodymium magnets are utilized for detecting metallic objects within structures such as nails and screws in drywall.

14. The tool of claim 6, designed to provide precise alignment and measurement capabilities, functioning independently as a torpedo level.

15. The tool of claim 6, featuring a removable battery cover to facilitate easy battery replacement and maintenance.

16. A stud finder device, comprising:
   a rectangular housing forming a device body with a first end, a second end, a top surface and bottom surface;
   an emitter including a laser or light emitting diode and being mounted within the housing and configured to project line or cross-beams from the first end of the device body;
   a sensor including a pair of permanent Neodymium magnets mounted relative the bottom surface of the device body and configured to detect studs within a wall;
   orthogonal float level devices on the top surface configured to establish for horizontal and vertical leveling;
   a light mechanism integrated into the device body configured to provide illumination;
   a distance measuring device associated with the second end of the device;
   a retractable push pin mechanism for temporarily attaching the device to the wall, the retractable push pin mechanism including a pin and an activation button located on the top surface and being spring-loaded for ease of deployment and retraction; and a removable marking implement integrated into the housing.

\* \* \* \* \*